US012781929B2

(12) United States Patent
Kho et al.

(10) Patent No.: US 12,781,929 B2
(45) Date of Patent: Nov. 3, 2026

(54) SYSTEM AND METHOD FOR DIRECTIONAL TWO COLOR GRADIENT EXTERNAL LIGHTING OF A DIGITAL DISPLAY DEVICE

(71) Applicant: Dell Products LP, Round Rock, TX (US)

(72) Inventors: Chee Loon Kho, Singapore (SG); Lei Guo, Singapore (SG); Tiak Hooy Sim, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 2 days.

(21) Appl. No.: 19/188,591

(22) Filed: Apr. 24, 2025

(65) Prior Publication Data

US 2026/0338337 A1 Oct. 29, 2026

(51) Int. Cl.

| | |
|---|---|
| ***F21S 10/02*** | (2006.01) |
| ***F21V 5/04*** | (2006.01) |
| ***F21Y 105/18*** | (2016.01) |
| ***F21Y 113/13*** | (2016.01) |
| ***F21Y 115/10*** | (2016.01) |

(52) U.S. Cl.
CPC ............ *F21S 10/023* (2013.01); *F21V 5/048* (2013.01); *F21Y 2105/18* (2016.08); *F21Y 2113/13* (2016.08); *F21Y 2115/10* (2016.08)

(58) Field of Classification Search
CPC ........ F21S 10/02–023; F21V 5/04–048; F21Y 2105/10–18; F21Y 2113/10–13; F21Y 2115/10; G02B 6/0011–0031
See application file for complete search history.

(56) References Cited

U.S. PATENT DOCUMENTS

| | | | |
|---|---|---|---|
| 8,061,884 B2 | 11/2011 | Harbers | |
| 8,582,055 B2 * | 11/2013 | Kawai | G02F 1/133605 362/616 |
| 8,674,616 B2 | 3/2014 | Holman | |
| 10,228,507 B2 | 3/2019 | Sherman | |
| 10,393,941 B2 | 8/2019 | Nichol | |
| 10,598,848 B2 | 3/2020 | Coleman | |
| 11,703,631 B2 | 7/2023 | Dau | |
| 11,860,396 B2 | 1/2024 | Vasylyev | |
| 2018/0074257 A1 | 3/2018 | McCollum | |

* cited by examiner

*Primary Examiner* — Jason M Han
(74) *Attorney, Agent, or Firm* — Prol Intellectual Property Law, PLLC; H. Kenneth Prol

(57) ABSTRACT

A digital display device executing machine readable code instructions of a display device directional color gradient lighting system comprises a first light emitting diodes (LED) group for emitting a first-colored light in plural LED zones across a first light guide plate causing decreasing intensity of the first-colored light, and a second LED group for emitting a second-colored light in the LED zones across a second light guide plate causing increasing intensity of the second-colored light such that a color transition gradient zone is perceived from the light guide plates through an external lens layer of an exterior lighting system for a display device. The display device hardware controller executes machine readable code instructions to direct pairs of LEDs in each LED zone to emit colored light at different intensities across the LED zones such that the shape of the color transition gradient zone varies across the exterior lighting system.

20 Claims, 9 Drawing Sheets

SYSTEM AND METHOD FOR DIRECTIONAL TWO COLOR GRADIENT EXTERNAL LIGHTING OF A DIGITAL DISPLAY DEVICE

FIELD OF THE DISCLOSURE

The present disclosure generally relates to digital display devices that operatively couples with an information handling system to perform as monitors or external displays for the information handling system. The present disclosure more specifically relates to a standalone digital display device having exterior lighting that includes two colors forming a gradient of color controllable via a digital display device hardware controller executing machine readable code instructions of a display device directional color gradient lighting system to dynamically set light intensity values for a light emitting diode (LED) of a first color and an LED of a second color within each of a plurality of LED zones of light guide plates disposed across the width of the digital display device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. An information handling system may include a digital display device or operatively couple to a standalone digital display device for user interaction.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
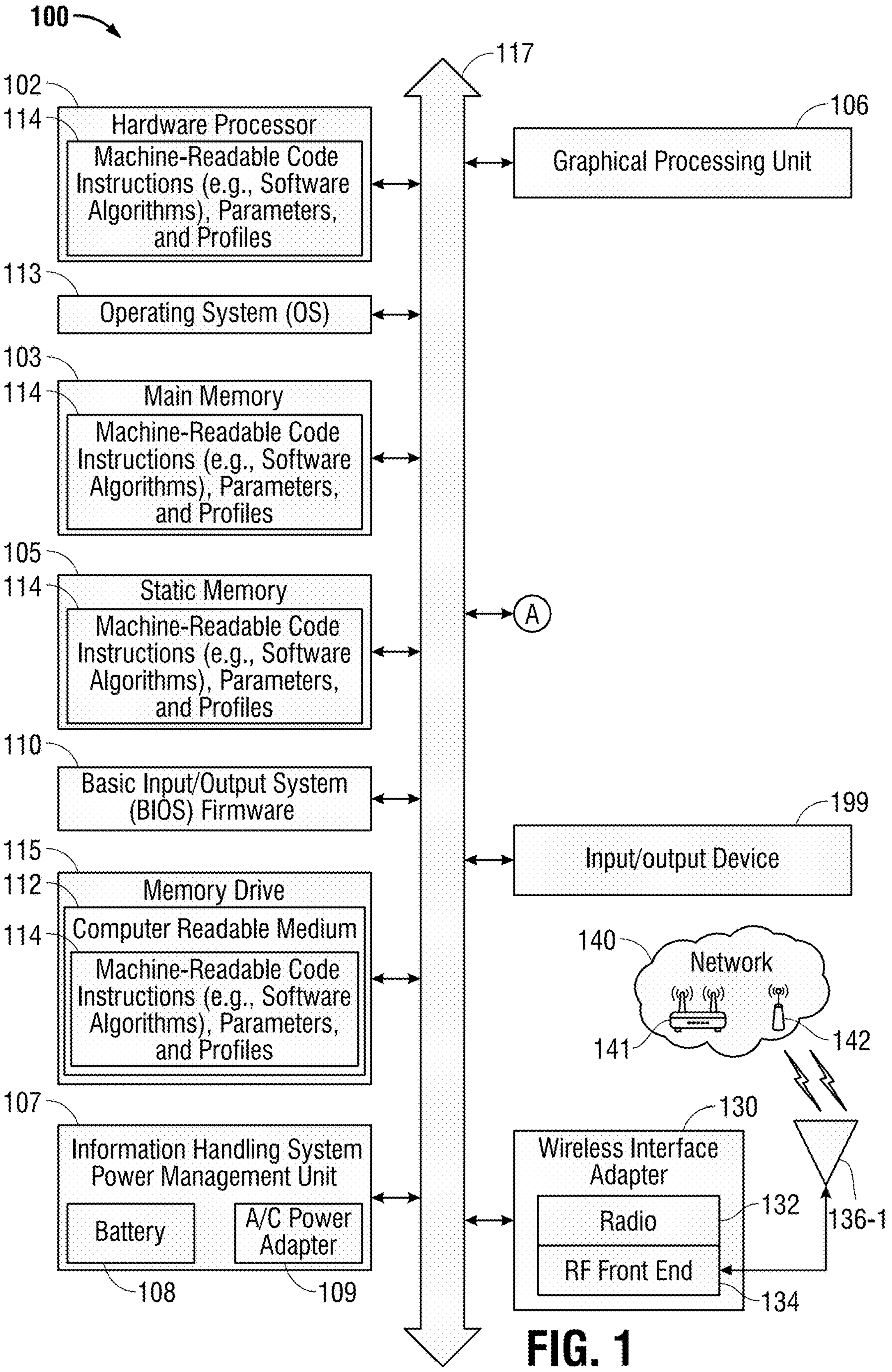
FIG. 1 is a block diagram illustrating an information handling system operatively coupled to a digital display device executing machine readable code instructions of a display device directional color gradient lighting system with light guide plates according to an embodiment of the present disclosure.
Figure 1:
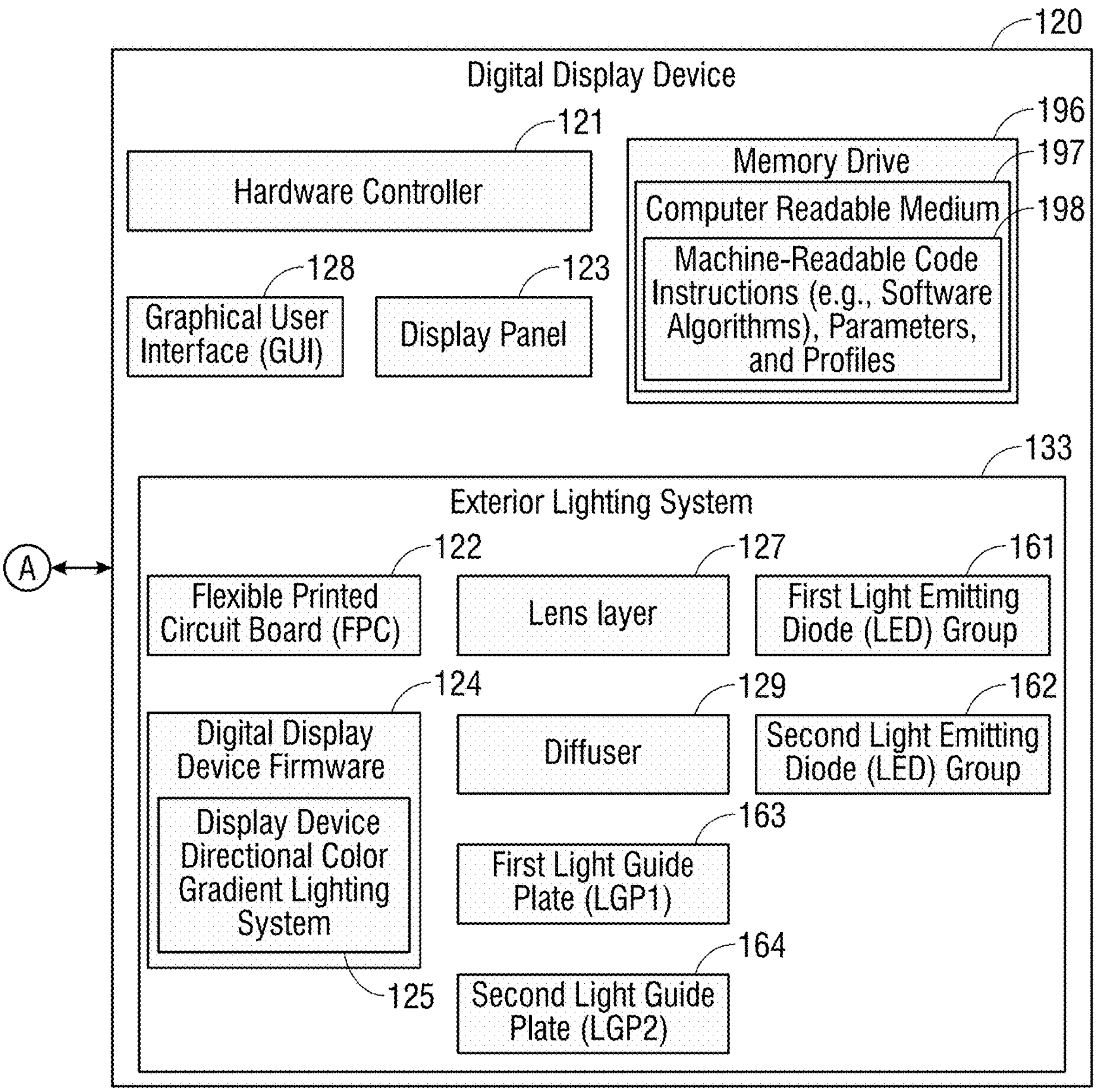

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Standalone digital display devices may operatively couple to information handling systems to act as monitors or external displays for the information handling systems. Some digital displays have external lighting effects, such as a display of a color gradient for a single color, ranging from a brightest intensity for that color, such as blue, for example, to black, or a lowest intensity for that color. These external lighting effects may provide aesthetics as well as function to light a room or office and even respond to media on the information handling system as background or ambient light. Embodiments of the present disclosure include an exterior lighting system for a digital display device that may be capable of displaying a gradient of two colors, such that the displayed light moves from a highest brightness of a first color toward the top of the exterior lighting system on the digital display, such as blue, for example, to a highest brightness of a second color, such as green, for example, toward the bottom of the exterior lighting system on the digital display. Further, the height at which the displayed color transitions from the first color, or blue, to the second color, or green, in example embodiments herein may vary across the width of the exterior lighting system on the digital display device exterior housing, giving the color gradient a wave-like appearance. Finally, embodiments of the present disclosure may vary the heights at which this transition occurs over time, so as to dynamically change the shape of such a wave-like appearance over time to appear to move in some embodiments.

Embodiments of the present disclosure may include a first group of side-firing light emitting diodes (LEDs) for emitting light of a first color operatively coupled across an outer surface of a flexible printed circuit board and a second group of side-firing LEDs for emitting light of a second color across an inner surface of the flexible printed circuit board. The two groups of LEDs of a first color and a second color are arranged to side-fire into light guide plates to form a plurality of LED zones across the width of the flexible printed circuit board with those light guide plates. Each LED zone may contain a single LED from the first group of LEDs and a single LED from the second group of LEDs. The intensity of light emitted by each pair of LEDs in each LED zone may be controlled separately from other LED zones of those light guide plates via a hardware controller for the flexible printed circuit board executing machine readable code instructions of the display device directional color gradient lighting system.

The exterior lighting system for the display device may include a portion of the flexible printed circuit board may be disposed across the inner surface of a first light guide plate, such that the first group of side-firing LEDs are situated adjacent to a side wall of the first light guide plate for side-firing light of the first color into the first light guide plate. An outer surface of a second light guide plate may be disposed across a portion of the inner surface of the flexible printed circuit board, such that the second group of side-firing LEDs are situated adjacent to a side wall of the second light guide plate, for side-firing light of the second color into the second light guide plate. A semi-transparent or transparent lens layer may be disposed on an outer surface of the first or outer light guide plate in some embodiments. Further, a diffuser sheet may line the outer surface of the first or outer light guide plate under the semi-transparent or transparent lens layer to diffuse light from the first and second light guide plates. It is understood that the first light guide plate and the second light guide plate are arranged parallel or adjacent to one another and either may be the outer light guide plate for the exterior lighting system in various embodiments. The exterior lighting system may include the light guide plates and the semi-transparent or transparent lens layer fixed to the digital display device housing to allow visible light to be emitted via the LEDs, through the first or second light guide plates and through the semi-transparent or transparent lens as well as any other layers of the exterior lighting system of various embodiments herein.

A hardware controller for the flexible printed circuit board at the standalone digital display device in embodiments herein may execute machine readable code instructions of the display device directional color gradient lighting system to direct the first group of side-firing LEDs situated along a side of a series of LED zones across the first light guide plate to emit light of a first color. This may cause the first light guide plate to display light as a gradient of the first color from a highest intensity of the first color on the top side of the first light guide plate closest to the flexible printed circuit board to a lowest intensity of the first color on the bottom side of the first light guide plate furthest from the flexible printed circuit board in an embodiment.

In addition, a hardware controller for the flexible printed circuit board of the digital display device in embodiments herein may execute machine readable code instructions of the display device directional color gradient lighting system to direct a second group of side-firing LEDs disposed across an inner surface of the flexible printed circuit board and situated along a side of the series of LED zones across the second light guide plate to emit light of a second color. This may cause the second light guide plate to display light as a gradient of the second color from a lowest intensity of the second color on the top side of the second light guide plate closest to the flexible printed circuit board to a highest intensity of the second color on the bottom side of the second light guide plate furthest from the flexible printed circuit board in an embodiment. In this way, the two adjacent first and second light guide plates of the exterior lighting system project opposite lighting gradients of the first and second colors from the housing of the digital display device across the series of LED zones.

For each LED zone across the width of the first light guide plate in embodiments herein, a hardware controller for the flexible printed circuit board executes machine readable code instructions of the display device directional color gradient lighting system to direct one of the first group of side-firing LEDs to emit light of the first color at an intensity that dictates how far downward across the LED zone in the first light guide plate that the first color will be visible. This may form a stripe or portion of the displayed first color gradient in the first LED zone across the first light guide plate of the exterior lighting system on the chassis of the digital display device. In another aspect of embodiments herein, the digital display hardware controller for the flexible printed circuit board executes machine readable code instructions of the display device directional color gradient lighting system to direct, for each LED zone across the second light guide plate, one of the second group of side-firing LEDs to emit light of the second color at an intensity that dictates how far upward from the bottom of the second light guide plate the second color will be visible. Both the first and second light guide plates may be formed with changing index of refraction or seeded with diffusion material across the light guide plate structure to decrease or increase, respectively, the intensity of the type of colored light passing through them. In an example embodiment, the first and second light guide plates may be oriented opposite in embodiments herein in terms of decreasing or increasing intensity of the type of colored light passing through them. A gain, this may add to the stripe or portion a displayed second color gradient in the first LED zone from across the second, adjacent light guide plate of the exterior lighting system on the chassis of the digital display device.

Light of the first color emitted through LED zones of the first light guide plate in embodiments may combine or overlap with light of the second color emitted through the second light guide plate to emit a color gradient across two colors with a potential blend of colors displayed by the exterior lighting system of the digital display device. Display of the color gradients from the first color to the second color across the plural light guide plates and a semi-transparent or transparent lens disposed on an outer surface of a diffuser sheet lining the outer surface of the first or outer light guide plate may even out and further blend the light colors in some embodiments. In embodiments, the location of a gradient transition zone across the plural light guide plates and the semi-transparent or transparent lens at which the light emitted changes from one color to another may vary in each LED zone vertical stripe of the semi-transparent or transparent lens width to cause a gradient zone in which the emitted light moves from the first color to the second color to take on a wave shape across the width of LED zone vertical stripes for the plural light guide plates and the semi-transparent or transparent lens layer. Further, the digital display hardware controller for the flexible printed circuit board executes machine readable code instructions of the display device directional color gradient lighting system to vary the intensities at which each of the first group of LEDs and the second group of LEDs in each of the plurality of LED zones emits light over time to cause the gradient transition zone in the LED zones in which the emitted light to moves from the first color to the second color may dynamically change shape across the width of the semi-transparent tinted or transparent lens of the exterior lighting system over time.

Turning now to the figures, FIG. 1 illustrates an information handling system 100 similar to the information handling systems according to several aspects of the present disclosure. As described herein, a digital display device 120 in an embodiment may operatively couple to an information handling system 100 to act as a standalone monitor or external display for the information handling system 100. Some digital displays have external lighting effects, such as a display of a color gradient for a single color, ranging from a brightest intensity for that color, such as blue, to fade out to a lowest intensity for that color. Embodiments of the present disclosure may be capable of displaying a gradient of two colors, such that the displayed light transitions from a highest brightness of a first color toward the top of an exterior lighting system 133 for the digital display device 120, such as blue, for example, to a highest brightness of a second color, such as green, for example, toward the bottom of the exterior lighting system 133, on or within the back of a housing for the display panel 123 of the digital display device 120. Further, the height at which the displayed color gradient transitions from the first color, or blue, to the second color, or green, in example embodiments may vary across the width of the digital display device 120 exterior housing, giving the color gradient a wave-like appearance. Finally, the heights of the color gradient transition zone at which this transition occurs across a plurality of LED zones may vary over time, so as to dynamically change the shape of a wave-like appearance of two color light gradients across the exterior lighting system 133 over time.

The exterior lighting system 133 of the digital display device 120 in an embodiment may include a first group of side-firing light emitting diodes (LEDs) 161 for emitting light of a first color, operatively coupled across an outer surface of a flexible printed circuit board 122, and a second group of side-firing LEDs 162 for emitting light of a second color across operatively coupled across an inner surface of the flexible printed circuit board 122. The first group of side-firing LEDs 161 emit light into a side edge of a first light guide plate 163 in an embodiment. The second group of side-firing LEDs 164 emit light into a side edge of a second light guide plate 164. Pairs of one side firing LED from the first LED group 161 and one side firing LED from the second LED group 162 form a plurality of LED zones across the width of the flexible printed circuit board 122 and the first and second light guide plates 163 and 164. The first and second light guide plates 163 and 164 may be arranged parallel or adjacent to one another in a stack up of the exterior lighting system 133. Each LED zone may contain a single LED from the first group of LEDs 161 and a single LED from the second group of LEDs 162. The intensity of light emitted by each pair of LEDs in each LED zone may be controlled separately from other LED zones via a hardware controller 121 for the flexible printed circuit board 122 executing machine readable code instructions of the display device directional color gradient lighting system 125.

A portion of the flexible printed circuit board 122 may be disposed across the inner surface of a first light guide plate 163, such that the first group of side-firing LEDs 161 are situated adjacent to a side wall of the first light guide plate 163 for side-firing light of the first color into the first light guide plate 163 in an embodiment. An outer edge surface of a second light guide plate 164 may be disposed across a portion of the inner surface of the flexible printed circuit board 122, such that the second group of side-firing LEDs 162 are situated adjacent to a side wall of the second light guide plate 164, for side-firing light of the second color into the second light guide plate 164. In an embodiment, a user may provide a user-selected first color, such as blue, for example, and user-selected second color, such as green, for example, via graphical user interface (GUI) 128 executed as part of the machine readable code instructions of the display device directional color gradient lighting system 125 for controlling color options for the first group of side-firing LEDs 161 and the second group of side-firing LEDs 162.

The digital display hardware controller 121 for the flexible printed circuit board 122 in the digital display device 120 in an embodiment may execute machine readable code instructions 198 of the display device directional color gradient lighting system 125 to direct the first group of side-firing LEDs 161 situated along the series of LED zones across the first light guide plate 163 to emit light of a first color. This may cause the first light guide plate 163 to display light of the first color as a gradient of color from the exterior lighting system 133 from a highest intensity of the first color on the top side of the first light guide plate 163 closest to the flexible printed circuit board 122 to a lowest intensity of the first color on the bottom side of the first light guide plate 163 furthest from the flexible printed circuit board 122. In addition, a hardware controller 121 for the flexible printed circuit board 122 in an embodiment may execute machine readable code instructions 198 of the display device directional color gradient lighting system 125 to direct a second group of side-firing LEDs 162 disposed across the flexible printed circuit board 122 and situated along the side of a second light guide plate 164 to emit light of a second color to cause the second light guide plate 164 to display light of the second color as a reverse gradient of color from a lowest intensity of the second color on the top side of the second light guide plate 164 closest to the flexible printed circuit board 122 to a highest intensity of the second color at the bottom side of the second light guide plate 164 furthest from the flexible printed circuit board 122. As described in embodiments herein, both the first light guide plate 163 and second light guide plate 164 may be formed with changing index of refraction or seeded with diffusion material across the light guide plate structure to decrease or increase, respectively, the intensity of the type of colored light passing through them. In an example embodiment, the first light guide plate 163 and second light guide plate 164 may be oriented opposite in embodiments herein in terms of decreasing or increasing intensity of the type of colored light passing through them. This may provide for a light gradient display of two colors across the first and second light guide plates 163 and 164 with a gradient transition zone between the first color and the second color in each LED zone of the exterior lighting system 133 for the digital display device 120.

For each LED zone across the width of the first light guide plate 163 in an embodiment, the digital display hardware controller 121 for the flexible printed circuit board 122 may execute machine readable code instructions 198 of the display device directional color gradient lighting system 125 to direct one of the first group of side-firing LEDs 161 to emit light of the first color at an intensity that dictates how far across (e.g., down) the first light guide plate 163 that the light of the first color will be visible. The gradient of first color displayed across the first light guide plate may form a stripe portion from that LED zone in an embodiment. In another aspect of an embodiment, for each corresponding LED zone across the second, parallel or adjacent light guide plate 164, a hardware controller 121 for the flexible printed circuit board 122 executes machine readable code instructions 198 of the display device directional color gradient lighting system 125 to direct one of the second group of side-firing LEDs 162 to emit light of the second color at an intensity that dictates how far across (e.g., upward) the height of the second light guide plate 164 that the light of the second color will be visible. Again, this gradient of second color displayed across the second light guide plate may add to the stripe portion from that LED zone in an embodiment forming a dual color stripe with a gradient transition from the first color to the second color.

Light of the first color emitted through the first light guide plate 163 in an embodiment may combine with light of the second color emitted through the second light guide plate 164 to emit a two color gradient with a gradient transition zone from the first color to the second color across the two light guide plates 163 and 164 and an outer semi-transparent or transparent lens or transparent lens 127 of the exterior lighting system 133 in an embodiment. The outer semi-transparent or transparent lens or transparent lens 127 may be disposed on an outer surface of the exterior lighting system 133 and over a diffuser sheet 129. The diffuser sheet 129 may line an outer surface of the first light guide plate 163 or the second light guide plate 164. In an embodiment, the diffuser sheet 129 may be disposed between the outer semi-transparent or transparent lens or transparent lens 127 and the light guide plates 163 or 164 of the exterior lighting system 133. In an embodiment, the location or height a transition gradient zone between the two colors of each separate LED zone displayed through the semi-transparent or transparent lens or transparent lens 127 may vary across each vertical stripe to give a wave type shape of displayed color transitions. Further, the location or height a transition gradient zone between the two colors of each separate LED zone displayed through the semi-transparent or transparent lens or transparent lens 127 may dynamically vary across the LED zones to cause the gradient transition zone in which the two colors of emitted light transition to move dynamically across the exterior lighting system 133 in some embodiments. Further, the digital display hardware controller 121 for the flexible printed circuit board 122 in an embodiment may execute machine readable code instructions 198 of the display device directional color gradient lighting system 125 to vary the intensities at which each of the first group of LEDs 161 and the second group of LEDs 162 in each of the plurality of LED zones emits light over time to cause the gradient transition zone between colors of emitted light or of one particular color to dynamically move to change the perceived shape of one or both colors across the width of the exterior lighting system 133 on or within the digital display device 120 housing in embodiments of the present disclosure.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term “system” shall also be taken to include any collection of systems or sub-systems that individually or jointly execute a set, or plural sets, of computer readable code instructions to perform one or more computer functions, via one or more hardware processing resources.

The information handling system 100 may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), a graphics processing unit (GPU) 106, other hardware controllers, or any combination thereof. Additional components of the information handling system 100 may include one or more storage devices such as static memory 105 or drive unit 115. The information handling system 100 may include or interface with one or more communications ports for communicating with external devices, as well as one or more input/output (IO) devices 199, a video/graphics digital display device 120, or any combination thereof. Digital display devices 120 may include an external, standalone digital display device operatively coupled to the information handling system 100 in embodiments herein. Portions of an information handling system 100 may themselves be considered information handling systems 100.

The digital display device 120 may also include display device memory 196, (volatile (e.g., random-access memory, etc.), or static, nonvolatile (read-only memory, flash memory etc.) or any combination thereof). Digital display device 120 may include memory 196, which may be volatile or nonvolatile memory (read-only memory, flash memory etc.) or any combination thereof storing machine readable code instructions (e.g., software or firmware algorithms), parameters, and profiles 198 executable by the digital display hardware controller 121. One or more hardware processing resources may also be included within digital display device 120, such as a hardware controller 121 that may be a scaler hardware processor, a digital signal processing (DSP) controller, a microcontroller, other hardware controllers, or any combination thereof. In other embodiments, the digital display hardware controller 121 at a digital display device 120 may comprise one or more hardware processing resources such as a scaler processing unit separate from or included as part of a DSP controller, or timing controller (TCON).

Information handling system 100 may include devices or modules that embody one or more of the hardware devices or hardware processing resources executing machine readable code instructions for one or more systems and modules. The information handling system 100 may execute machine readable code instructions (e.g., software or firmware algorithms), parameters, and profiles 114 that may operate on servers or systems, remote data centers, or on-box in individual client information handling systems according to various embodiments herein. The digital display device 120 may include hardware controller 121 to execute machine readable code instructions (e.g., software or firmware algorithms), parameters, and profiles 198 that may operate according to various embodiments herein. In some embodiments, it is understood that any or all portions of machine readable code instructions (e.g., software or firmware algorithms), parameters, and profiles 114 or 198 may operate on a plurality of information handling systems 100, or in some portions such as those of the present disclosure may execute on the digital display device 120.

The information handling system 100 may include the hardware processor 102 such as a central processing unit (CPU) or other hardware processing resources on information handling system 100. The digital display device 120 may also include hardware processing resources such as a hardware controller 121 which may comprise one or more hardware processing resources such as a scaler processing unit separate from or included as part of a DSP controller, or timing controller (TCON), other microcontroller units, or other processing hardware resources. Any of the hardware processing resources may operate to execute machine readable code instructions 114 or 198 that are either firmware 124 or software code. The digital display hardware controller 121 may execute machine readable digital display device firmware 124 of a display device directional color gradient lighting system 125 according to embodiments herein. The display device directional color gradient lighting system 125 may be firmware, software, or some combination and may execute in part via the CPU of the information handling system in some embodiments such as for presenting a graphical user interface (GUI) 128 to a user.

The hardware processor 102 in the information handling system 100 may comprise a vector CPU or multi-vector CPU or may be a graphics processing unit (GPU) 106 or other hardware processing resource. Moreover, the information handling system 100 may include memory such as main memory 103, static memory 105, and disk drive unit 115 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, GPU 106, or any other hardware processing device. The information handling system 100 may also include one or more buses 117 operable to transmit communications between the various hardware components such as any combination of various I/O devices 199, as well as between hardware processors 102, GPU 106 or other, the operating system (OS) 113, the basic input/output system (BIOS) 110, the wireless interface adapter 130, or a radio module 132, among other components described herein. In an embodiment, the hardware processor 102, and/or GPU 106 may execute one or more bus drivers in order to transmit this data between the information handling system 100 and the input/output devices 199 described herein. As described herein, the information handling system 100 further includes a video/graphics digital display device 120 with a display panel 123 for display video data received from the GPU 106 or other hardware processing resource of the information handling system 100 to render images for display by the display panel 123. The video/graphics digital display device 120 may have a display panel 123 in an embodiment that may function as a liquid crystal display (LCD), an organic light emitting diode (OLED), a flat panel display, or a solid-state display panel. In embodiments herein, a digital display device 120 having a display screen panel 123 further has an exterior lighting system 133 for display of aesthetic or ambient light from a case or chassis of the digital display device as described in embodiments herein. It is appreciated that the video/graphics digital display device 120 may be wired or wireless to be one or more external video/graphics digital display devices 120 that allow a user to increase the display-viewable desktop area by extending the desktop displayed for the information handling system 100 in an embodiment.

A network interface device of the information handling system 100 may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (W PAN), a wireless wide area network (WWAN), or other network. In embodiments described herein, the wireless interface device 130 with its radio 132, RF front end 134 and antenna 136 is used to communicate with the network 140, via, for example, a Bluetooth® or Bluetooth® Low Energy (BLE) protocols, or other WPAN or WLAN protocols.

In an embodiment, a WAN, WWAN, LAN, and WLAN may each include an AP 141 or base station 142 used to operatively couple the information handling system 100 to a network 140 via a wireless interface adapter 130. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, wireless network wireless A Ps 141 or base stations 142 may be operatively connected to the information handling system 100. Wireless interface adapter 130 may include one or more radio frequency (RF) subsystems (e.g., radio 132) with transmitter/receiver circuitry, modem circuitry, one or more antenna RF front end circuits 134, one or more wireless controller circuits, amplifiers, antennas 136, and other circuitry of the radio 132, such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11a/h/j/n/ac/ax/be including Wi-Fi 6, Wi-Fi 6e, and the emerging Wi-Fi 7 standard. It is understood that any number of available channels may be available in WLAN under the 2.4 GHZ, 5 GHZ, or 6 GHz bands which may be shared communication frequency bands with WWAN protocols or Bluetooth® protocols in some embodiments. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100, or integrated with another wireless network interface capability, or any combination thereof.

In some embodiments, one or more hardware processors or hardware controllers executing software, firmware, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium 112 that includes machine-readable code instructions, parameters, and profiles 114 and a computer-readable medium 197 that includes machine-readable code instructions, parameters, and profiles 198 or receives and executes instructions, parameters, and profiles 114 or 198 responsive to a propagated signal, so that a hardware device connected to a network 140 may communicate voice, video, or data over the network 140. Further, the machine readable code instructions 114 or 198 may be transmitted or received over the network 140 via the network interface device or wireless interface adapter 130. The present disclosure also contemplates machine-readable code instructions, parameters, and profiles 198 executing on a hardware controller 121 on-board the digital display device 120 and includes machine readable code instructions, parameters, and profiles of digital display device firmware 124 or display device directional color gradient lighting system 125 to execute system and methods of the present disclosure.

The information handling system 100 may include a set of instructions 114, digital display device firmware 124 or display device directional color gradient lighting system 125 that may be executed to cause the digital display device 120 to perform any one or more of the methods or computer-based functions disclosed herein. Various software modules or firmware modules comprising application machine readable code instructions 114 may be coordinated by an OS 113, and/or via an application programming interface (API) include a unified device API described herein. An example OS 113 may include Windows®, Android®, and other OS types. Example APIs may include Win 32, Core Java API, or Android APIs. In example embodiments, machine readable code instructions 114 may be executed by a hardware processor 102, GPU 106, or any other hardware processing resource and may include software agents, or other aspects or components used to execute the methods and systems for software applications of various types including generation of digital display data for presentation via the display panel 123 of the digital display device 120 as described herein. In an embodiment, a GUI 128 used in connection with the display device directional color gradient lighting system 125 may be generated by the GPU 105, CPU 102 or other hardware processing resource of the information handling system 100 as digital display data for presentation on the display panel 123 of the digital display device 120.

In further example embodiments of the present disclosure, machine readable code instructions 198 may be executed by a hardware controller 121 or other hardware processing resource on-board a digital display device 120 for execution of digital display device firmware 124 or software. For example, the digital display hardware controller 121 or other hardware processing resource on-board a digital display device 120 executes machine readable code instructions 198, that may be firmware 124, of the display device directional color gradient lighting system 125 according to embodiments herein. The digital display device 120 may include digital display device memory 196, which may include machine-readable code instructions, parameters, and profiles 198 in which one or more sets of machine-readable code instructions, parameters, and profiles 198 such as firmware or software can be embedded to be executed by the digital display hardware controller 121, or other microcontroller unit to perform the processes described herein. The digital display device memory 196 may also contain space for data storage. Further, the machine-readable code instructions, parameters, and profiles 198 may embody one or more of the methods as described herein. In a particular embodiment, the machine-readable code instructions, parameters, and profiles 198 may reside completely, or at least partially, within the digital display device memory 196 during execution by the digital display hardware controller 121 of the digital display device 120.

In an embodiment, the information handling system 100 may include a disk drive unit 115. The disk drive unit 115 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 115 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 115 during execution by the hardware processor 102, or GPU 106 of information handling system 100.

Main memory 103, digital display device memory 196, or other memory of the embodiments described herein may contain computer-readable medium (not shown), such as RAM in an example embodiment. An example of main memory 103, or digital display device memory 196 includes random access memory (RAM) such as static RAM (SRAM), dynamic RAM (DRAM), non-volatile RAM (NV-RAM), or the like, read only memory (ROM), another type of memory, or a combination thereof. Static memory 105, or digital display device memory 196 may contain computer-readable medium (not shown), such as NOR or NAND flash memory in some example embodiments. The applications and associated APIs, for example, may be stored in static memory 105 or on the disk drive unit 115 that may include access to a machine-readable code instructions, parameters, and profiles 114 such as a magnetic disk or flash memory in an example embodiment. Digital display device firmware 124, or display device directional color gradient lighting system 125, for example, may be stored in digital display device memory 196 in computer readable medium 197 that may include access to a machine-readable code instructions, parameters, and profiles 198 such as a magnetic disk or flash memory in an example embodiment. While the computer-readable medium is shown to be a single medium, the term “computer-readable medium” includes a single medium or multiple media, such as a centralized or distributed database, and/or associated caches and servers that store one or more sets of machine-readable code instructions. The term “computer-readable medium” shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 107 (a.k.a. a power supply unit (PSU)). The PMU 107 may include a hardware controller and executable machine-readable code instructions to manage the power provided to the components of the information handling system 100 such as the hardware processor 102 and other hardware components described herein. The PMU 107 may control power to one or more components including the one or more drive units 115, the hardware processor 102 (e.g., CPU), the GPU 106, a video/graphic digital display device 120, or other wired I/O devices 199 and other components that may require power when a power button has been actuated by a user. In an embodiment, the PMU 107 may monitor power levels and be electrically coupled to the information handling system 100 to provide this power. The PMU 107 may be coupled to the bus 117 to provide or receive data or machine-readable code instructions. The PMU 107 may regulate power from a power source such as the battery 108 or AC power adapter 109. In an embodiment, the battery 108 may be charged via the AC power adapter 109 and provide power to the components of the information handling system 100, via wired connections as applicable, or when AC power from the AC power adapter 109 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 112 or 197 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a “system,” a “device,” a “module,” a “controller,” or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
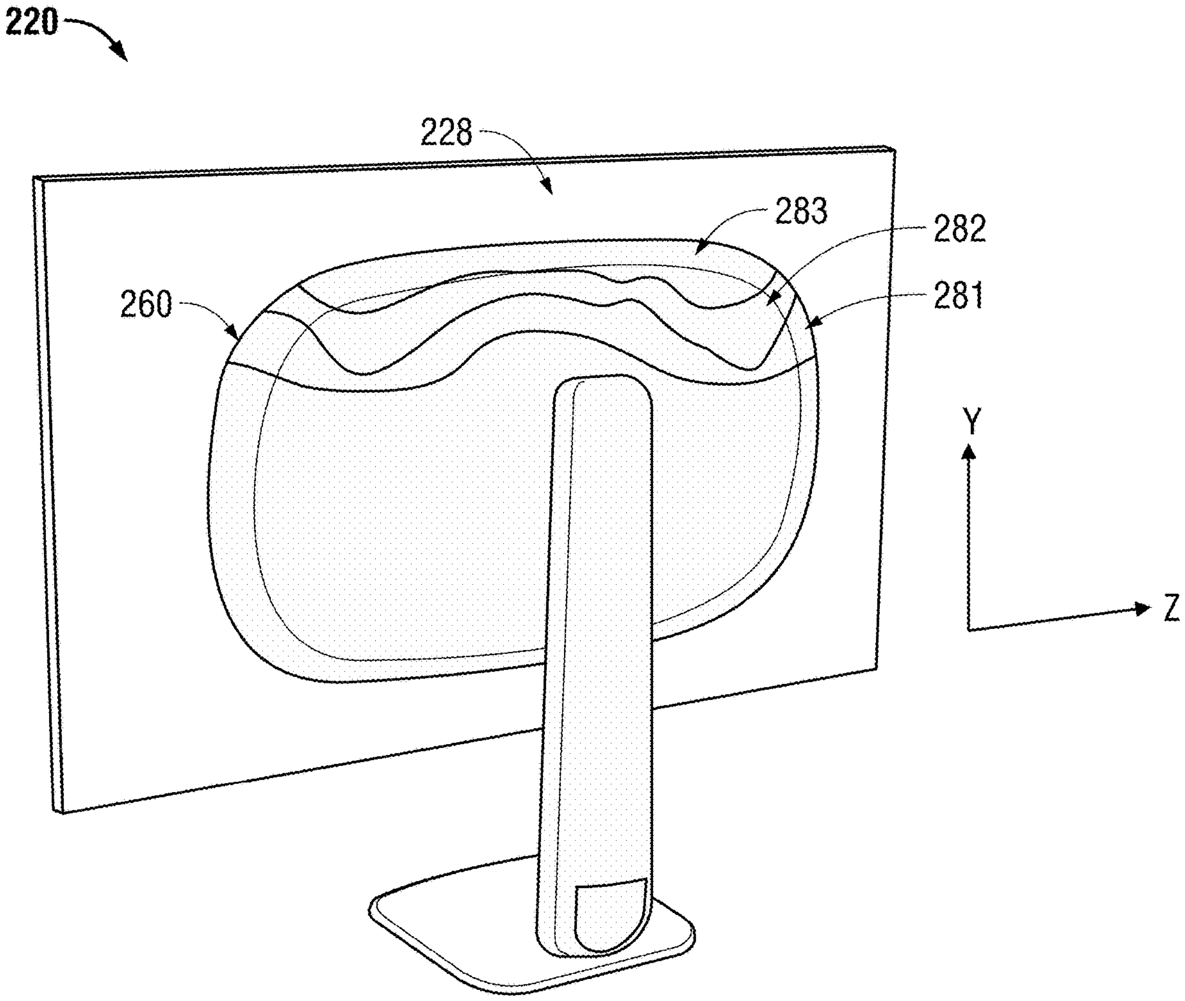
FIG. 2 is a graphical diagram illustrating a rear perspective view of a digital display device having exterior lighting that includes two colors forming a gradient of color via light guide plates and side-firing light emitting diodes (LEDs) according to an embodiment of the present disclosure.

FIG. 2 is a graphical diagram illustrating a rear perspective view of a digital display device having an exterior lighting system as part of its outer case that includes two colors forming a gradient of those colors across the exterior lighting system controllable via a digital display device hardware controller executing machine readable code instructions of a display device directional color gradient lighting system according to an embodiment of the present disclosure. As described herein, the digital display device 220 incorporating a display device directional color gradient lighting system in an embodiment may be capable of displaying a gradient of two colors 281 and 283 and in any of multiple dimensions, such as an x-direction (horizontal) gradient or a y-direction (vertical) gradient in various embodiments. In an embodiment, the displayed light gradients in either dimension changes from a highest brightness of a first color 283 toward the top of the exterior lighting system on the digital display 220 to a highest brightness of a second color 281 toward the bottom of the of the exterior lighting system. In other embodiments, the displayed light gradients in either dimension changes from a highest brightness of the first color 283 or second color 281 across the top of the exterior lighting system on the digital display 220 to a fade out of that color toward the bottom of the exterior lighting system and the horizontal dimension may have a gradient transition from the first color 283 to the second color 281. Further, the location, such as height or across the horizontal, of a color gradient transition zone 282 between the displayed first color 283, or blue, to the second color 281, or green, may vary across the width or height of the exterior lighting system of the digital display device exterior housing 228, giving the color gradient a wave-like appearance in some embodiments. Finally, in an embodiment, the height location or vertical location of the color gradient transition zone 282 may be changed over time with dynamic adjustment to the brightness of the two colors of LED in each LED zone of the exterior lighting system such that the shape of such a wave-like appearance at the color gradient transition zone 282 dynamically changes over time on the digital display device exterior housing 228.

A hardware controller for the flexible printed circuit board in an embodiment may execute machine readable code instructions of the display device directional color gradient lighting system to direct a first group of side-firing light emitting diodes (LEDs) disposed across an outer surface of the flexible printed circuit board to emit light of a first color 283, such as blue. The first light guide plate may cause the first-colored light 283 emitted by the first group of LEDs to be visible as a gradient of color in the X or Y (vertical or horizontal) direction from a highest intensity of the first color 283 nearest to the first group of LEDs to a lowest intensity of the first color 283 away from the flexible PCB having the first group of LEDs based on intensity of those LEDs. Similarly, the digital display hardware controller for the flexible printed circuit board in an embodiment may also execute machine readable code instructions of the display device directional color gradient lighting system to direct a second group of side-firing LEDs disposed across an inner surface of the flexible printed circuit board to emit light of the second color 281, such as green, for example. The second light guide plate may cause the second-colored light 281 by the second group of LEDs to be visible as a gradient of color from a lowest intensity of the second color 281 closer to the second group LEDs to a highest intensity of the second color 281 away from the second group of LEDs.

In other words, the second light guide plate may be formed with changing index of refraction or seeded with progressively increased deposition of diffusion material across the light guide plate structure to increase intensity of the second colored light 281 (e.g., green) passing through it. In embodiments herein, the second light guide plate has a second light guide structure with varied index of refraction or progressive deposition of diffusion material causing intensity of visible light of the second color to increase across the second light guide plate as perceived through the semi-transparent or transparent lens layer. The first light guide plate may decrease intensity of first colored light 283 (e.g., blue) passing through it from the top of light guide plates and the semi-transparent or transparent lens of the exterior lighting system resulting in the display of first colored light 283 (bluer) toward the top of the digital display rear housing 228 and second colored light 281 (greener) toward the bottom in one example embodiment. In some embodiments, the first light guide plate may also be formed with changing index of refraction or seeded with diffusion material across the light guide plate structure but oriented opposite to the second light guide layer in the exterior lighting system. In an embodiment, the first light guide plate has a first light guide structure with varied index of refraction or decreasing deposition of diffusion material causing intensity of visible light of the first color to decrease across the first light guide plate as perceived through the semi-transparent or transparent lens layer. In other embodiments, distribution of dominant colors across LED zones as stripes of light across the exterior lighting system on the digital display rear housing 228 may transition horizontally from left to right or right to left so that a first color is dominant on one side while the second color is dominant on the other side, or vice-versa, leading to a horizontal gradient of change displayed from the semi-transparent or transparent lens. Each horizontal side of the exterior lighting system may have either the first or second dissipating color while the middle has color gradient transition zone 282 between the first color and the second color. In further embodiments, the color gradient transition zone 282 may be vertical, instead of horizontal as shown, with a horizontal transition gradient of light colors from LEDs on a side of the exterior lighting system progressing from left to right or right to left.

For each LED zone across the width (X-direction) of the first light guide plate in an embodiment, the digital display hardware controller for the flexible printed circuit board may execute machine readable code instructions of the display device directional color gradient lighting system to direct one of the first group of LEDs to emit light of the first color 283 at a first LED zone-specific intensity for the LED in that LED zone from the first group. As described herein, this first LED zone-specific intensity may vary from LED zone to LED zone. The distance across the LED zone that the light of the first color 283 will be visible in a stripe of the LED zone from the exterior lighting system will be dictated by this this first LED zone-specific intensity. Further, the color gradient transition zone 282 at which the visible light changes from the first color 283 to a mixture 282 of the first and second color and then transitions to a second color 281, is dictated by this first LED zone-specific intensity, which controls brightness of the first LED in the LED pair (e.g., one from the first LED group and one from the second LED group) in each LED zone. The digital display hardware controller for the flexible printed circuit board in an embodiment may execute machine readable code instructions of the display device directional color gradient lighting system to the second LED in the LED pair for each LED zone to emit light of the second color 281 at a second LED zone-specific intensity for each LED zone across the width (X-direction) of the second light guide plate. The second LED zone-specific intensity in an embodiment may dictate the distance across the second light guide plate in a vertical stripe that the light of the second color 281 will be visible at the side of the second light guide plate away from the LED pair in embodiments herein. Further, the color gradient transition zone 282 at which the visible light changes from the first color 283 to a mixture 282 of the first and second color and then transitions to a second color 281, is also dictated by the second LED zone-specific intensity as well, which controls brightness of the second LED in the LED pair in each LED zone. This second LED zone-specific intensity may control brightness of the second LED in the LED pair in each LED zone that belongs to the second LED group.

Light of the first color 283 emitted through the first light guide plate in an embodiment may combine with light of the second color 281 emitted through the second light guide plate to emit a color gradient, from the first color 283, to a mixture 282 of the first color 283 and the second color 281 in a color gradient transition zone 282, and finally to the second color 281, across the plural light guide plates and through the semi-transparent or transparent lens disposed over them to form an outer surface of the exterior lighting system in the rear housing 228. The location of the color gradient transition zone 282 across the first light guide plate and second light guide plate fixed to a portion of the rear housing 228 of the digital display device 220 may vary in each vertical stripe of the LED zones as emitted through the semi-transparent or transparent lens of the exterior lighting system. This color gradient transition zone 282 locations in which the visible light moves from the first color 283 to the second color 281 may take on a wave shape across the LED zones that are across the exterior lighting system as perceived through the semi-transparent or transparent lens and, in some embodiments, diffused by a diffuser layer. The digital display hardware controller for the flexible printed circuit board in an embodiment may execute machine readable code instructions of the display device directional color gradient lighting system to vary the intensities at which each of the first group of LEDs and the second group of LEDs for LED pairs in each of the plurality of LED zones emits light over time to cause the color gradient transition zone 282 to cause movement of the color gradient transition zone 282 over time in some embodiments.

Figure 3:
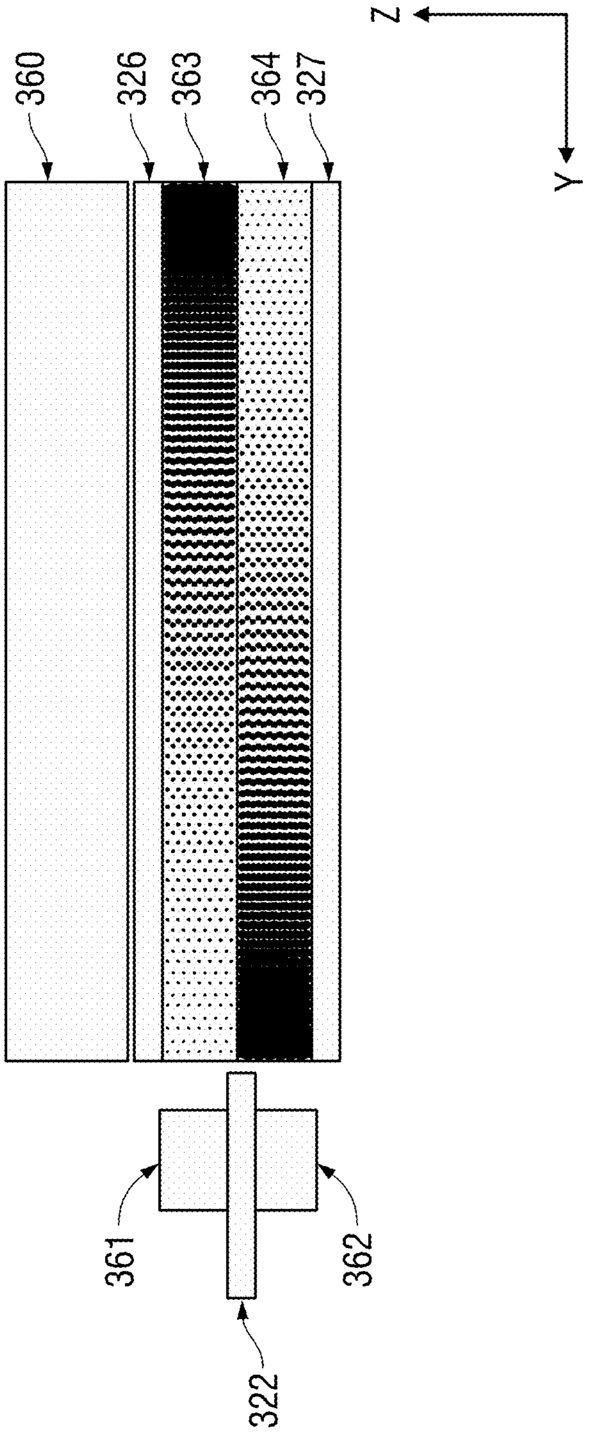
FIG. 3 is a graphical diagram illustrating a cross-sectional view of a stack up of an exterior lighting system with light guide plates and other layers for a side-firing light emitting diode (LED) of a first color and a side-firing LED of a second color controlled by a digital display device hardware controller of a printed circuit board that dynamically sets light intensity values according to an embodiment of the present disclosure.

FIG. 3 is a graphical diagram illustrating cross-section view of a stack up of a exterior lighting system with a printed circuit board having an LED pair to illuminate a side of a first light guide plate and a second light guide plate with a first color of a first LED of a second color of a second LED according to an embodiment of the present disclosure. A first LED 361 from a first group of side-firing LEDs emits light of a first color through as side of a first light guide plate 363. The first LED may be operatively coupled in an embodiment on an outer surface of a flexible printed circuit board 322. A second LED 362 from second group of side-firing LEDs emits light of a second color through a side of a second light guide plate 364. The second LED 362 may be operatively coupled in an embodiment on an inner surface of the flexible printed circuit board 322. The LED pair 361, 362 and the layered first and second light guide plates 363 and 364 form an example LED zones of a plurality of LED zones across the width of the exterior lighting system in embodiments herein.

The flexible printed circuit board 322, as described in greater detail below with respect to FIG. 5, may extend across plural LED zones (into or out of the page of FIG. 3) with plural pairs of LEDs 361 and 362 for each LED zone. The intensity of light of the first color allowed through the light guide plate 363 in an embodiment may decrease with distance away from the first-colored light LED 361, for example, decreasing from the left to the right. The intensity of light of the second color allowed through the light guide plate 364 in an embodiment may increase with distance away from the second-colored light LED 362, for example, increasing from the left to the right. In embodiments herein, both the first light guide plate 363 and second light guide plate 364 may be formed with changing index of refraction across the light guide plate structure or seeded with diffusion material across the light guide plate structure to decrease or increase, respectively, the intensity of the type of colored light passing through them. In an example embodiment, the first light guide plate 363 and second light guide plate 364 may be oriented opposite in embodiments herein in terms of decreasing or increasing intensity of the type of colored light passing through them.

A diffuser sheet 326 may be disposed in an embodiment across an outer surface of the first light guide plate 363. It is understood in the presently shown embodiment that the first light guide plate 363 is the outward facing light guide plate and light is displayed or emitted through the semi-transparent or transparent lens 360 of the exterior lighting system on a display housing of a digital display device. In other embodiments, the order of the first light guide plate 363 and the second light guide plate 364 could be switched with the second light guide plate 364 as the outer light guide plate and diffuser sheet 326 placed on an outer surface of the second light guide layer 363. In other embodiments, the diffuser sheet 326 could be placed between the first light guide plate 363 and the second light guide sheet 364 or vice-versa. The diffuser sheet 326 in an embodiment may scatter and spread out the light emitted through the first light guide plate 363 and the second light guide plate 364 toward the semi-transparent or transparent lens 360, to create a more even and softer illumination overall as well as more even and softer gradient transitions. A reflector sheet 327 may be disposed in an embodiment across an inner surface of the second light guide plate 364, or other inner light guide surface, to reflect light outward toward the semi-transparent or transparent lens 360 to enhance brightness in embodiments herein.

A portion of the flexible printed circuit board 322 in an embodiment may be disposed at the first light guide plate 363, such that the first group of side-firing LEDs 361 are situated adjacent to a side wall of the first light guide plate 363 for side-firing light of the first color into the first light guide plate 363. In an embodiment, the second light guide plate 364 may be disposed at the inner surface of the flexible printed circuit board 322, such that the second group of side-firing LEDs 362 are situated adjacent to a side wall of the second light guide plate 364, for side-firing light of the second color into the second light guide plate 364. A semi-transparent or transparent external lens layer 360 in an embodiment may be disposed across an outer surface of the diffuser sheet 326. The semi-transparent or transparent lens 360 forms an outer surface of the exterior lighting system on the display housing in an embodiment and may protect the internal components of the digital display device along with the display housing or as part of the display housing from contamination from outside particles in an embodiment.

A hardware controller for the flexible printed circuit board 322 in an embodiment may execute machine readable code instructions of the display device directional color gradient lighting system to direct the first group of side-firing LEDs 361 disposed across the outer surface of the flexible printed circuit board 322 to emit light of the first color, such as blue, for example. The first light guide plate 363 may cause the first-colored light (e.g., blue light) emitted by the first group of LEDs 361 to be visible as a gradient of color from a highest intensity of the first color or blue light on the side of the first light guide plate 363 closest to the LED 361 to a lowest intensity of blue light on the side of the first light guide plate 363 furthest from the LED 361 on flexible printed circuit board 322. In other words, intensity of blue light emitted through the light guide plate 363 in such an embodiment may decrease with distance away from the first LED group 361 in an embodiment.

In an embodiment, the digital display hardware controller for the flexible printed circuit board 322 may execute machine readable code instructions of the display device directional color gradient lighting system to direct the second group of side-firing LEDs 362 disposed across the inner surface of the flexible printed circuit board 322 to emit light of the second color, such as green, for example. The second light guide plate 364 may cause the second-colored light, such as green, emitted by the second group of LEDs 362 to be visible as a gradient of color from a lowest intensity of the second color, or green light, on the side of the second light guide plate 364 closest to the LED 362 to a highest intensity of the green light on the side of the second light guide plate 364 furthest from the LED 362 on the flexible printed circuit board 322. In other words, intensity of green light emitted through the light guide plate 364 in such an embodiment may increase with distance away from the second LED group 362.

Thus, the second light guide plate 364 may increase intensity of the green light passing through it from the edge of the second light guide plate 364 and is disposed beneath the edge of the first light guide plate 363 that allows for the intensity of blue light to increase as blue light passes through it. It is contemplated that the opposite arrangement between the first-colored light and the second-colored light may be used and that the colors may vary, including be selected via a GUI by a user in embodiments herein. The first group of LEDs 361 and the second group of LEDs 362 may be multi-color red-green-blue (RGB) LEDs controllable for color selection of light of the first color and light of the second color via the digital display device controller. Light of the first color, such as blue, for example, emitted through the first light guide plate 363 in an embodiment may combine with light of the second color, such as green, emitted through the second light guide plate 364 to emit a color gradient, from blue, to teal in a color transition gradient zone, then to green, across LED zones as viewable through the semi-transparent or transparent lens in an exterior lighting system on the display housing. The digital display hardware controller for the flexible printed circuit board 322 in an embodiment may execute machine readable code instructions of the display device directional color gradient lighting system to dynamically vary the intensities at which each of the first group of LEDs 361 and the second group of LEDs 362 in each of a plurality of LED zones emits light over time for a moving effect in embodiments herein.

Figure 4:
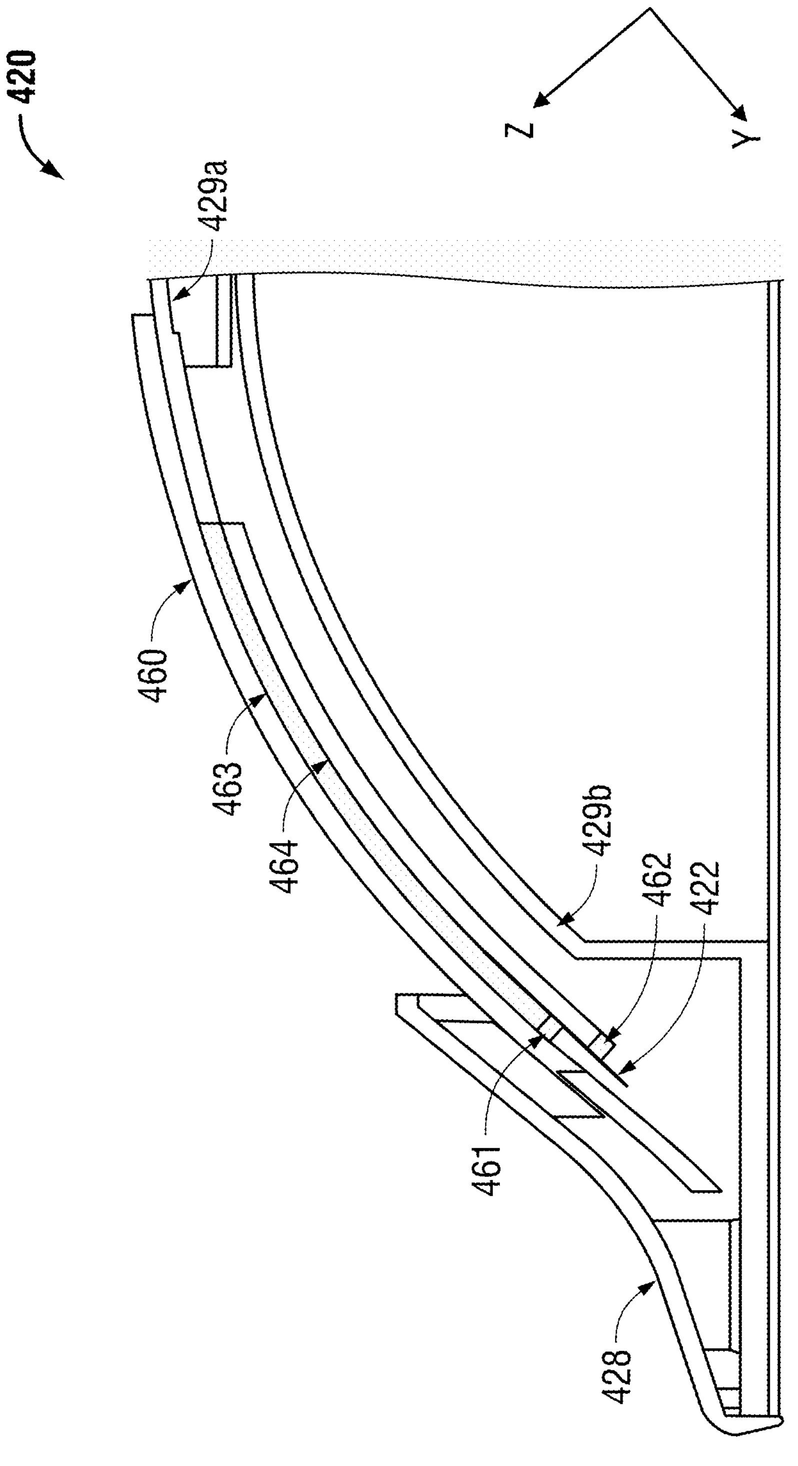
FIG. 4 is a graphical diagram illustrating a cut-away view of a portion of a digital display device having exterior lighting system with groups of side-firing LEDs that includes two colors forming a gradient of color according to an embodiment of the present disclosure.

FIG. 4 is a graphical diagram illustrating a top cut away view of a portion of a digital display device having exterior lighting that includes two colors forming a gradient of color across the exterior lighting system controllable via a digital display device hardware controller executing machine readable code instructions of a display device directional color gradient lighting system according to an embodiment of the present disclosure. A first group of side-firing light emitting diodes (LEDs) such as first side-firing LED 461 for emitting light of a first color, such as blue, for example, may be operatively coupled in an embodiment across an outer surface of a flexible printed circuit board 422. A second group of side-firing LEDs such as side-firing LED 462 for emitting light of a second color, such as green, may be operatively coupled across an inner surface of the flexible printed circuit board 422 to form a plurality of LED zones across the width of the flexible printed circuit board 422, as described in greater detail below with respect to FIG. 5.

A portion of the flexible printed circuit board 422 in an embodiment may be disposed up to or under a side surface of the first light guide plate 463, such that the first group of side-firing LEDs 461 are situated adjacent to a side wall of the first light guide plate 463 for side-firing light of the first color, such as blue, into the first light guide plate 463 in the negative Y direction. In an embodiment, the outer surface (side oriented furthest in the Z direction) of the second light guide plate 464 may be disposed up to or under a portion of the inner surface of the flexible printed circuit board 422, such that the second group of side-firing LEDs 462 are situated adjacent to a side wall of the second light guide plate 464, for side-firing light of the second color, such as green, into the second light guide plate 464 in the negative Y direction.

A semi-transparent or transparent external lens layer 460 in an embodiment may be disposed across an outer surface (side oriented furthest in the Z direction) of a diffuser sheet (not shown) disposed across an outer surface of the first light guide plate 463 and external to the second light guide plate 464. A portion of the semi-transparent or transparent external lens layer 460 may be fixed to one or more portions 429*a* and 429*b* of a housing 428 for the digital display 420. For example, an outer edge of the semi-transparent or transparent lens 460 situated beneath a portion of the housing back cover 428 and may be fixed to an inner portion 429*b* of the housing back cover 428 for the digital display device 420 at a side closest to the top edge of the digital display 420. In another aspect, a bottom edge of the semi-transparent or transparent lens 460 situated partially across an outer surface of an outer portion 429*a* of the housing 428 for the digital display 420 and may be fixed to the outer portion 429*a* of the housing 428 at a side of the semi-transparent or transparent lens 460 situated closest to the middle of the digital display 420, and form a furthest part of the exterior lighting system on or in the housing back cover 428 in the embodiment shown in FIG. 4.

A hardware controller is operatively coupled to or on the flexible printed circuit board 422. The digital display hardware controller of the digital display device 420 in an embodiment may execute machine readable code instructions of the display device directional color gradient lighting system to direct a first group of side-firing light emitting diodes (LEDs) such as side-firing LED 461 disposed across an outer surface of the flexible printed circuit board 422 to emit light of the first color, such as blue, for example. The first light guide plate 463 may cause the blue light emitted by the first group of LEDs 461 in such an example embodiment to be visible as a gradient of color from a highest intensity of blue light on the side of the first light guide plate 463 closest to the flexible printed circuit board 422 and first side-firing LED 461 to a lowest intensity of blue light on the side of the first light guide plate 463 furthest from the flexible printed circuit board 422 and first side-firing LED 461. This may cause a color gradient of decreasing intensity of the first-colored light moving down the exterior lighting system on the display housing 428 in a negative Y direction. This decreasing intensity gradient may be due to changing diffraction index or diffuser material as part of the first light guide plate 463 across the first light guide plate structure extending away from the side having the first side-firing LED 461.

In an embodiment, the digital display hardware controller for the flexible printed circuit board 422 may execute machine readable code instructions of the display device directional color gradient lighting system to direct a second group of side-firing LEDs such as second side-firing LED 462 disposed across an inner surface of the flexible printed circuit board 422 to emit light of the second color, such as green, for example. The second light guide plate 464 may cause the green light emitted by the second group of LEDs such as second side-firing LED 462 in such an example embodiment to be visible as a gradient of color from a lowest intensity of green light on the side of the second light guide plate 464 closest to the flexible printed circuit board 422 and second side-firing LED 462 to a highest intensity of the green light on the side of the second light guide plate 464 furthest from the flexible printed circuit board 422 in an embodiment. This may cause a color gradient of increasing intensity of the second-colored light moving down the exterior lighting system on the display housing 428 in a negative Y direction. This increasing intensity gradient may be due to changing diffraction index or diffuser material as part of the second light guide plate 464 across the second light guide plate structure extending away from the side having the second side-firing LED 462.

In other words, the second light guide plate 464 may increase intensity of the second-colored light, such as green, for example, and opposite of the first light guide plate 463 which may decrease intensity of the first-colored light passing from the first and second LEDs 461 and 462 respectively. In an embodiment, the orientation of the changing diffraction index or diffuser material extending across the light guide plate structures of the first light guide structure 463 and the second light guide plate 464 may be arranged opposite to one another to provide a two color gradient between the first colored light and the second colored light seen through the semi-transparent or transparent lens 460 across the exterior lighting system of embodiments herein.

Figure 5:
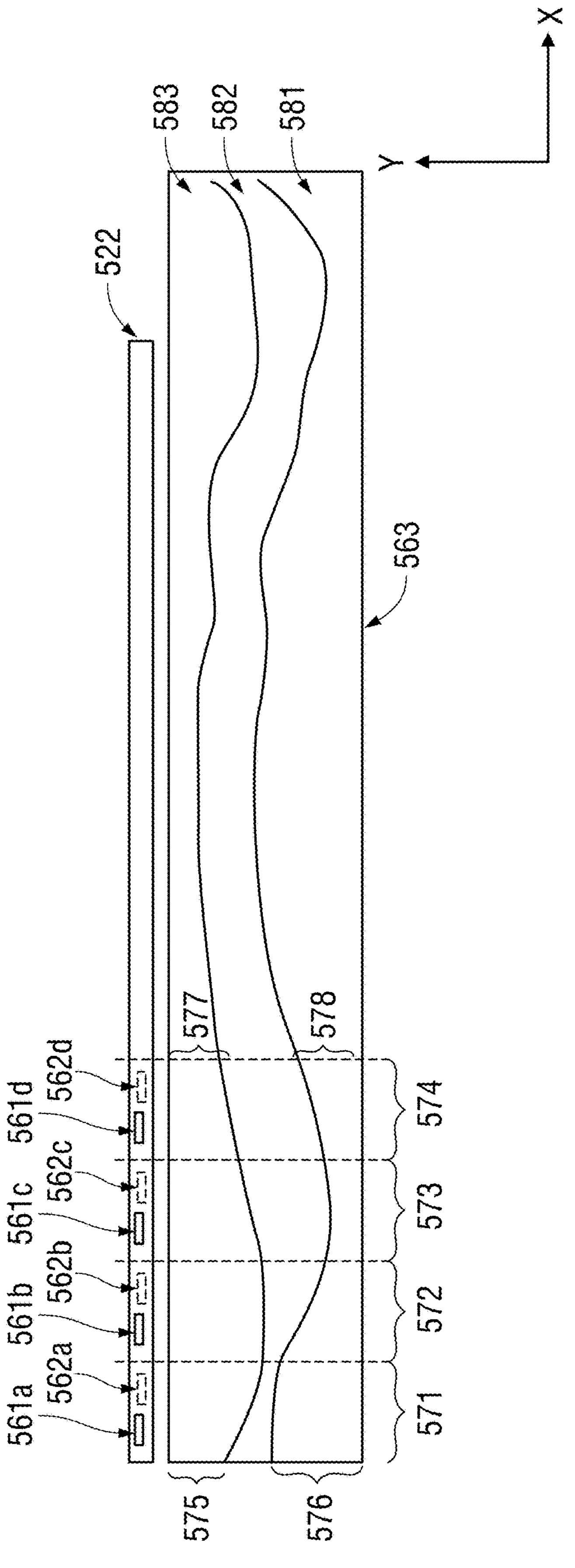
FIG. 5 is a graphical diagram illustrating a top view of plural light guide plates and a flexible printed circuit board working in tandem to dynamically set light intensity values for a pairs a side firing first-colored LED and a side firing second-colored LED within each of a plurality of LED zones for an exterior lighting system of a digital display device according to an embodiment of the present disclosure.

FIG. 5 is a graphical diagram illustrating an exterior lighting system with a first and second light guide plate operatively coupled to a digital display device flexible printed circuit board to work in tandem to dynamically set light intensity values for a light emitting diodes (LEDs) of a first color and LEDs of a second color within a plurality of LED zones according to an embodiment of the present disclosure. A first group of side-firing LEDs 561*a*, 561*b*, 561*c*, and 561*d* for emitting light of a first color 583, such as blue, may be operatively coupled in an embodiment across an outer surface of a flexible printed circuit board 522 and a second group of side-firing LEDs 562*a*, 562*b*, 562*c*, and 562*d* for emitting light of a second color 581, such as green, for example, may be operatively coupled across an inner surface of the flexible printed circuit board 522 to form a plurality of LED zones 571, 572, 573, or 574. The first group of side-firing LEDs 561*a*, 561*b*, 561*c*, and 561*d* and the second group of LEDs 562*a*, 562*b*, 562*c*, and 562*d* may be multi-color red-green-blue (RGB) LEDs controllable for color selection of light of the first color and light of the second color via the digital display device controller. The flexible printed circuit board with the first group of side-firing LEDs 561*a*, 561*b*, 561*c*, and 561*d* and the second group of side-firing LEDs 562*a*, 562*b*, 562*c*, and 562*d* may extend across the width (e.g., in the positive X direction) of the exterior lighting system including the semi-transparent or transparent lens 560 having the first and second light guide plates (not shown) underneath but light visible through the semi-transparent or transparent lens 560. Each LED zone, such as 571, in an embodiment may contain an LED pair including a single LED, such as 561*a* from the first group of LEDs and a single LED, such as 562*a* from the second group of LEDs. The intensity of light emitted by each pair of LEDs, such as 561*a* and 562*a*, in each LED zone, such as 571, may be controlled separately from other LED zones, such as LED zones 572, 573, and 574 and LED pairs assigned thereto, via a hardware controller for the flexible printed circuit board 522 executing machine readable code instructions of a display device directional color gradient lighting system.

A hardware controller for the flexible printed circuit board 522 in an embodiment may execute machine readable code instructions of the display device directional color gradient lighting system to direct a first group of side-firing light emitting diodes (LEDs) 561*a*, 561*b*, 561*c*, and 561*d* disposed across an outer surface of the flexible printed circuit board 522 to emit light of the first color 583, such as blue, but at potentially varying intensities depending on the LED zone 571, 572, 573, or 574. The first group of side-firing LEDs 561*a*, 561*b*, 561*c*, and 561*d* may be situated along a series of LED zones, such as 571, 572, 573, and 574 of a width-wise side in the X direction of a first light guide plate to cause the first light guide plate to display light of the first color 583, such as blue, in decreasing intensity in the negative Y direction. Thus, the first light guide plate in embodiments herein may cause the first-colored light 583, such as blue light emitted by the first group of LEDs 561*a*, 561*b*, 561*c*, and 561*d* to be visible from the semi-transparent or transparent lens 560 as a gradient of color from a highest intensity of the first color along the top of the exterior lighting system closest to the flexible printed circuit board 522 and the LED pair to a lowest intensity of the first color on the lowest portion of the exterior lighting system furthest from the flexible printed circuit board 522 and the LED pair (e.g., in the negative Y direction).

In an embodiment, the digital display hardware controller for the flexible printed circuit board 522 may execute machine readable code instructions of the display device directional color gradient lighting system to direct a second group of side-firing LEDs 562*a*, 562*b*, 562*c*, or 562*d* disposed across an inner surface of the flexible printed circuit board 522 to emit light of the second color 581. The second group of side-firing LEDs 562*a*, 562*b*, 562*c*, or 562*d* may be situated along a series of LED zones 571, 572, 573, and 574 and form the second LED in the LED pair assigned to each of the LED zones 571, 572, 573, and 574 across a width-wise side of the semi-transparent or transparent lens 560 and a second light guide plate (not shown, but disposed beneath the semi-transparent or transparent lens 560) to cause the semi-transparent or transparent lens 560 to display light of the second color 581, such as green, along the exterior lighting system via second light guide plate in embodiments herein.

For each LED zone, such as 571, the digital display hardware controller for the flexible printed circuit board 522 may execute machine readable code instructions of the display device directional color gradient lighting system to direct one of the first pair of LEDs, such as 561*a*, to emit light of the first color 583, such as blue, at a first LED zone-specific intensity in an embodiment. More specifically, the digital display hardware controller for the flexible printed circuit board 522 may execute machine readable code instructions of the display device directional color gradient lighting system to direct LED 561*a* to emit light of the first color 583, such as blue, at a first LED zone-specific intensity value. As another example, the digital display hardware controller for the flexible printed circuit board 522 may execute machine readable code instructions of the display device directional color gradient lighting system to direct LED 561*d* of the LED pair for the fourth LED zone 574 to emit light of the first color 583, such as blue, at another LED zone-specific intensity value.

As described herein, this LED zone-specific intensity may vary from LED zone to LED zone. The distance across the semi-transparent or transparent lens 560 of the exterior lighting system in the negative Y direction that each LED zone, in a vertical stripe that the light of the first color 583 diminishes and reaches a color gradient transition zone 582 between the first colored light 583 and the second colored light 581 may be varied among the LED zones 571, 572, 573, and 574 across a width-wise side of the semi-transparent or transparent lens 560 based on LED zone-specific intensity values for each LED pair for those LED zones 571, 572, 573, and 574. For example, as shown in LED zone 571, how far down from the semi-transparent or transparent lens the light of the first color 583, such as blue, will be visible is dictated by this first LED zone-specific intensity, which controls brightness of the LED of the LED pair in each LED zone that belongs to the first LED group. For example, because the first LED zone-specific intensity for LED zone 571 in an example embodiment, may be greater than the first LED zone-specific intensity for LED zone 574, the distance 575 in the negative Y direction within LED zone 571 may be greater than the distance 577 in the negative Y direction within LED zone 574. In this way, the color gradient transition zone 582 may see the first colored light 583 fade out across the LED zones 571, 572, 573, and 574 from the top of the semi-transparent or transparent lens 560 at different distances which may appear as a wave type appearance of the fade on the first-colored light 583 horizontally, in the X-direction, across the semi-transparent or transparent lens 560 in an embodiment herein in an embodiment herein.

The digital display hardware controller for the flexible printed circuit board 522 in an embodiment may execute machine readable code instructions of the display device directional color gradient lighting system to direct one of the second group of LEDs 562*a* 562*b*, 562*c*, or 562*d* in each LED pair to emit light of the second color 581, such as green, at a second LED zone-specific intensity for each LED zone 571, 572, 573, or 574 across the width in the X direction of semi-transparent or transparent lens 560 via the second light guide plate (not shown, but disposed beneath the first light guide plate and semi-transparent or transparent lens 560). The second LED zone-specific intensity for each LED pair in an embodiment may dictate the distance across the semi-transparent or transparent lens 560 in a stripe from the bottom of the second light guide plate for each LED zone 571, 572, 573, or 574 that the light of the second color 581, such as green, will be visible across the semi-transparent or transparent lens 560. This second LED zone-specific intensity controls brightness of the second LED in each LED pair from the second LED group, such as 562*a*, 562*b*, 562*c*, or 562*d* in each LED zone 571, 572, 573, or 574. More specifically, the digital display hardware controller for the flexible printed circuit board 522 may execute machine readable code instructions of the display device directional color gradient lighting system to direct LED 562*a* to emit light of the second color 581, such as green, at a second LED zone-specific intensity value for LED zone 571. As another example, the digital display hardware controller for the flexible printed circuit board 522 may execute machine readable code instructions of the display device directional color gradient lighting system to direct LED 562*d* to emit light of the second color 581, such as green, at another LED zone-specific intensity value for LED zone 574.

As described herein, this second LED zone-specific intensity may vary from LED zone to LED zone. The distance from the bottom of the exterior lighting system that the height in the positive Y direction extends from the bottom edge of the semi-transparent or transparent lens 560 via the second light guide plate in a vertical stripe that the light of the second color 581, such as green, will be visible is dictated by this second LED zone-specific intensity. For example, in LED zone 571 the light of the second color 581, such as green, will be visible based on this second LED zone-specific intensity set to controls brightness of the LED 562*a* of the LED pair 561*a*, 562*a* for LED zone 571. This second LED zone-specific intensity for LED 562*a* may be greater than the second LED zone-specific intensity for LED 562*d* of the LED pair 561*d*, 562*d* for LED zone 574. Thus, the distance 576 in the positive Y direction from the bottom of the exterior lighting system within LED zone 571 may be greater than the distance 577 in the positive Y direction within LED zone 574. In this way, the color gradient transition zone 582 may see the second colored light 583 begin to increase across the LED zones 571, 572, 573, and 574 from different locations of the color transition gradient zone 582 via the semi-transparent or transparent lens 560 at different distances from the bottom of the exterior lighting system which may appear as a wave type appearance of the increase on the first-colored light 583 horizontally, in the X-direction, across the semi-transparent or transparent lens 560 in an embodiment herein.

In an embodiment when both colored light LED groups are active in any or all of the LED zones 571, 572, 573, and 574, light of the first color 583, such as blue, emitted through the first light guide plate may combine with light of the second color 581, such as green emitted through the second light guide plate in a color transition gradient zone 582 to emit a color gradient, from the first color 583 to the second color 581, or from blue to green, across the height of the semi-transparent or transparent lens 560 disposed across a digital display housing. This variation may cause a color transition gradient zone 582 in which the visible light moves from the first color 583 to the second color 581, or from blue to green, to blend colors in some embodiments. Further, the location or size of the color transition gradient zone 582 may be varied across LED zones 571, 572, 573, and 574 based on first and second zone-specific intensity levels to the assigned LED pairs such that the color transition gradient zone 582 may take on a wave shape as perceived across the width in the X direction of the semi-transparent or transparent lens 560. In some embodiments, the digital display hardware controller for the flexible printed circuit board 522 may execute machine readable code instructions of the display device directional color gradient lighting system to dynamically vary the intensities, such as first and second zone specific intensities, at which each LED pair from the first group of LEDs 561*a*, 561*b*, 561*c*, and 561*d* and the second group of LEDs 562*a*, 562*b*, 562*c*, and 562*d* in each of the plurality of LED zones 571, 572, 573, and 574 emit light over time. This dynamic variation to the first and second zone-specific intensities of the pairs of LED may cause the color transition gradient zone 582 for each LED zones 571, 572, 573, and 574 to dynamically move and change shape for the transition from the first color 583 to the second color 581 across the width in the X direction of the semi-transparent or transparent lens 560 over time in an embodiment. This may provide an aesthetic effect from the exterior lighting system from the housing of the digital display device as well as provide changeable ambient lighting including dynamically changing ambient lighting.

Figure 6:
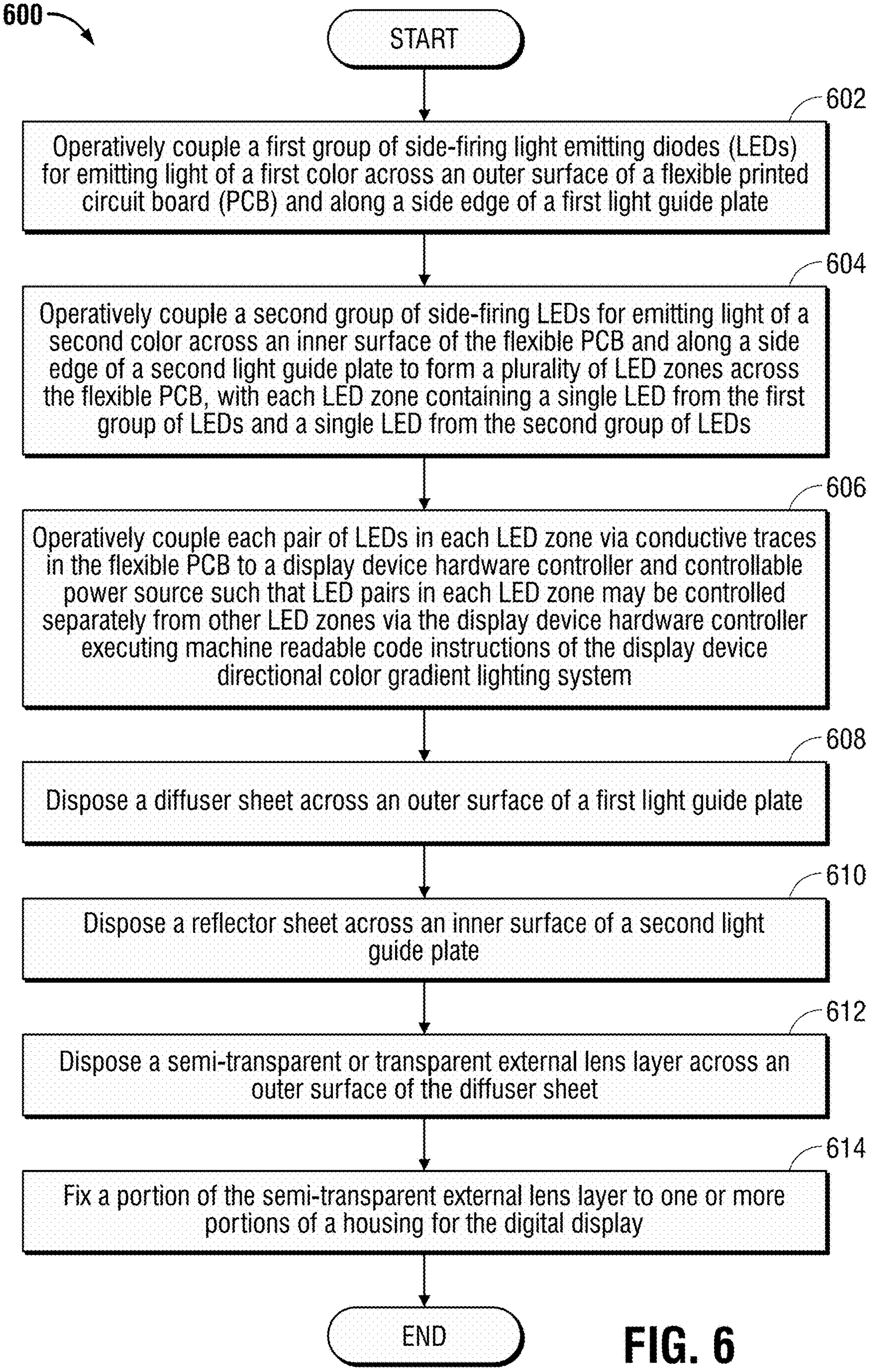
FIG. 6 is a flow diagram illustrating a method of assembling a digital display device having exterior lighting system that includes two colors forming a gradient of color controllable via execution of machine readable code instructions of a display device directional color gradient lighting system to dynamically set light intensity values for LED pairs of a first and second color within each of a plurality of LED zones according to an embodiment of the present disclosure.

FIG. 6 is a flow diagram illustrating a method of assembling a digital display device having an exterior lighting system that includes two colors forming a gradient of color controllable via a digital display device hardware controller executing machine readable code instructions of a display device directional color gradient lighting system to dynamically set light intensity values for those color gradients across the exterior lighting system according to an embodiment of the present disclosure. The exterior lighting system may include plural LED zones having LED pairs with an LED of a first color and an LED of a second color within each of the plurality of LED zones disposed across the width of the exterior lighting system on a housing of the digital display device according to an embodiment of the present disclosure. As described herein, the digital display device incorporates a digital display device hardware controller, such as a DSP controller or other hardware resource, to execute machine readable code instructions of a display device directional color gradient lighting system in an embodiment.

Control of the LED pairs across the LED zones of the exterior lighting system may be capable of displaying a gradient of two colors, such that the displayed light moves from a highest brightness of a first color toward the top of the exterior lighting system on the housing of the digital display to a highest brightness of a second color toward the bottom of the exterior lighting system. Further, the height at which the displayed colors transition in a color transition gradient zone from the first color to the second color in an example embodiment may vary across the LED zones across the width of the digital display device exterior housing, giving the color gradient of the exterior lighting system a wave-like appearance in some embodiments herein.

At block 602, a first group of side-firing light emitting diodes (LEDs) for emitting light of a first color may be operatively coupled in an embodiment across an outer surface of a flexible printed circuit board. The flexible printed circuit board may be formed such that plural side-firing LEDs of the first group, which may have selectable color of a first color, are mounted across the flexible printed circuit board and are coupled via wire traces in the flexible printed circuit board. The flexible printed circuit board is mounted in the exterior lighting system of embodiments herein such that the first group of side-firing LEDs are disposed adjacent along a side edge of a first light guide plate. The first light guide plate is formed with a changing index of refraction or changing levels of diffractive material across the first light guide plate structure such that light emitted through the first light guide plate will decrease in intensity as it travels through the first light guide plate structure in an embodiment. The first group of side-firing LEDs are spaced along the flexible printed circuit board and are formed along the side edge of the first light guide plate to emit light of a first color into the side edge of the first light guide plate.

At block 604, a second group of side-firing LEDs for emitting light of a second color may be operatively coupled across an inner surface of the flexible printed circuit board to across the width of the flexible printed circuit board. The flexible printed circuit board is mounted in the exterior lighting system of embodiments herein such that the second group of side-firing LEDs are disposed adjacent along a side edge of a second light guide plate. The second light guide plate is formed with a changing index of refraction or changing levels of diffractive material across the second light guide plate structure such that light emitted through the second light guide plate will increase in intensity as it travels through the second light guide plate structure in an embodiment. The second group of side-firing LEDs are spaced along the flexible printed circuit board and are formed along the side edge of the second light guide plate to emit light of a second color into the side edge of the first light guide plate.

Each LED of the second group of side-firing LEDs may be paired with a corresponding LED from the first group of side-firing LEDs opposite from it on the flexible printed circuit board to form LED pairs for a plurality of LED zones of the exterior lighting system. Each LED zone in an embodiment may have an LED pair with a single LED from the first group of LEDs and a single LED from the second group of LEDs across the flexible printed circuit board. The flexible printed circuit board may be formed such that plural side-firing LEDs of the second group, which may have selectable color of a second color, are mounted and spaced across the inner side of the flexible printed circuit board for each of the LED zones along with the plural side-firing LEDs for the first group. Further, the first light guide plate and the second light guide plate are stacked adjacent or parallel to one another in the exterior lighting system as described and shown in FIG. 3 above in embodiments herein. It is understood that either the first or second light guide plate may be the outer facing light guide plate in various embodiments herein and increasing or decreasing intensity of the light guide plate structures may be switched.

At block 606, the LEDs of each LED zone across the flexible printed circuit board are operatively coupled to wire traces in the flexible printed circuit board. The wire traces in the flexible printed circuit board are formed to operatively couple the LEDs of LED pairs for each LED zone to a controllable power source, such as a digital display device PMU or other power source, to control illumination of LEDs in LED pairs from the first and the second group of side-firing LEDs at varying or controllable intensities via the display device hardware controller in embodiments herein. The intensity of light emitted by each pair of LEDs in each LED zone may be controlled separately from other LED zones, via a display device hardware controller executing machine readable code instructions of a display device directional color gradient lighting system to be operatively coupled to the flexible printed circuit board and the power source upon installation of the exterior lighting system to control power to each LED in the pairs of LEDs for the LED zones.

For example, in embodiments described with respect to FIGS. 2 and 4, a first group of side-firing LEDs 461 for emitting light of a first color 283, such as blue, may be operatively coupled in an embodiment across an outer surface of a flexible printed circuit board 422 and to traces in the flexible printed circuit board 422 to a power source controlled by the display device hardware controller. A second group of side-firing LEDs 462 for emitting light of a second color, such as green 281, may be operatively coupled across an inner surface of the flexible printed circuit board 422 and to traces in the flexible printed circuit board 422 to a power source controlled by the display device hardware controller to form a plurality of LED zones across the width of the flexible printed circuit board 422.

In yet another example embodiment described with reference to FIG. 5, a first group of side-firing LEDs 561*a*, 561*b*, 561*c*, and 561*d* for emitting light of a first color 583 may be operatively coupled to conductive traces across an outer surface of a flexible printed circuit board 522 and a second group of side-firing LEDs 562*a*, 562*b*, 562*c*, and 562*d* for emitting light of a second color 581 for example, may be operatively coupled to conductive traces across an inner surface of the flexible printed circuit board 522 to form a plurality of LED zones 571, 572, 573, or 574 across the width of the exterior lighting system. Each LED zone 571, 572, 573, and 574, in an embodiment, contain LED pairs may contain a single LED from the first group of LEDs 561*a*, 561*b*, 561*c*, and 561*d* and a single LED from the second group of LEDs 562*a*, 562*b*, 562*c*, and 562*d*. The intensity of light emitted by each LED in each pair of LEDs, such as 561*a* and 562*a*, in LED zone 571, may be controlled separately from other LED zones, such as LED zones 572, 573, and 574, via a hardware controller executing machine readable code instructions of a display device directional color gradient lighting system and power source operatively coupled via the traces of the flexible printed circuit board 522.

At block 608, a diffuser sheet may be disposed in an embodiment across an outer surface of the first light guide plate or the outer light guide plate in the stack up of the exterior lighting system of embodiments herein. For example, in an embodiment described with respect to FIG. 3, a diffuser sheet 326 may be disposed across an outer surface of the first light guide plate 363.

At block 610, a reflector sheet may be disposed in an embodiment under an inner surface of a second light guide plate or the inner light guide plate in the stack up of the exterior lighting system of embodiments herein. For example, in an embodiment described with respect to FIG. 3, a reflector sheet 327 may be disposed across an inner surface of the second light guide plate 364.

A semi-transparent or transparent external lens layer in an embodiment at block 612 may be disposed across an outer surface of the diffuser sheet in a stack up of the exterior lighting system of embodiments herein. In an example embodiment described with reference to FIG. 3, a semi-transparent or transparent external lens layer 360 may be disposed across an outer surface of the diffuser sheet 326. In other example embodiments described with reference to FIG. 4, the semi-transparent or transparent external lens layer 460, respectively, may be disposed across an outer surface of a diffuser sheet disposed across an outer surface of the first light guide plate 463.

At block 614, a portion of the semi-transparent external lens layer may be fixed to one or more portions of a housing for the digital display. For example, in embodiments described with reference to FIGS. 4, a portion of the semi-transparent external lens layer 460 may be fixed to one or more portions 429*a* and 429*b* of a housing for the digital display 420. For example, a top edge of the semi-transparent or transparent lens 460 (e.g., also shown as 260 on the digital display device 260 with display housing 228 in FIG. 2) situated on or in a housing back cover 428 may be fixed to an inner portion 429*b* of the housing 428 for the digital display 420 at a top edge of the digital display 420. In another embodiment, an inner edge of the semi-transparent or transparent lens 460 situated partially across an outer surface of an outer portion 429*a* of the housing 428 for the digital display 420 may be fixed to the center or mid-section 429*a* of the housing 428 at a side of the semi-transparent or transparent lens 460 situated closest to the middle of the digital display 420. The method for assembling a digital display device having exterior lighting that includes two colors forming a gradient of color controllable via a display device directional color gradient lighting system to dynamically set light intensity values for LEDs of a first and second color within each of a plurality of LED zones may then end.

Figure 7:
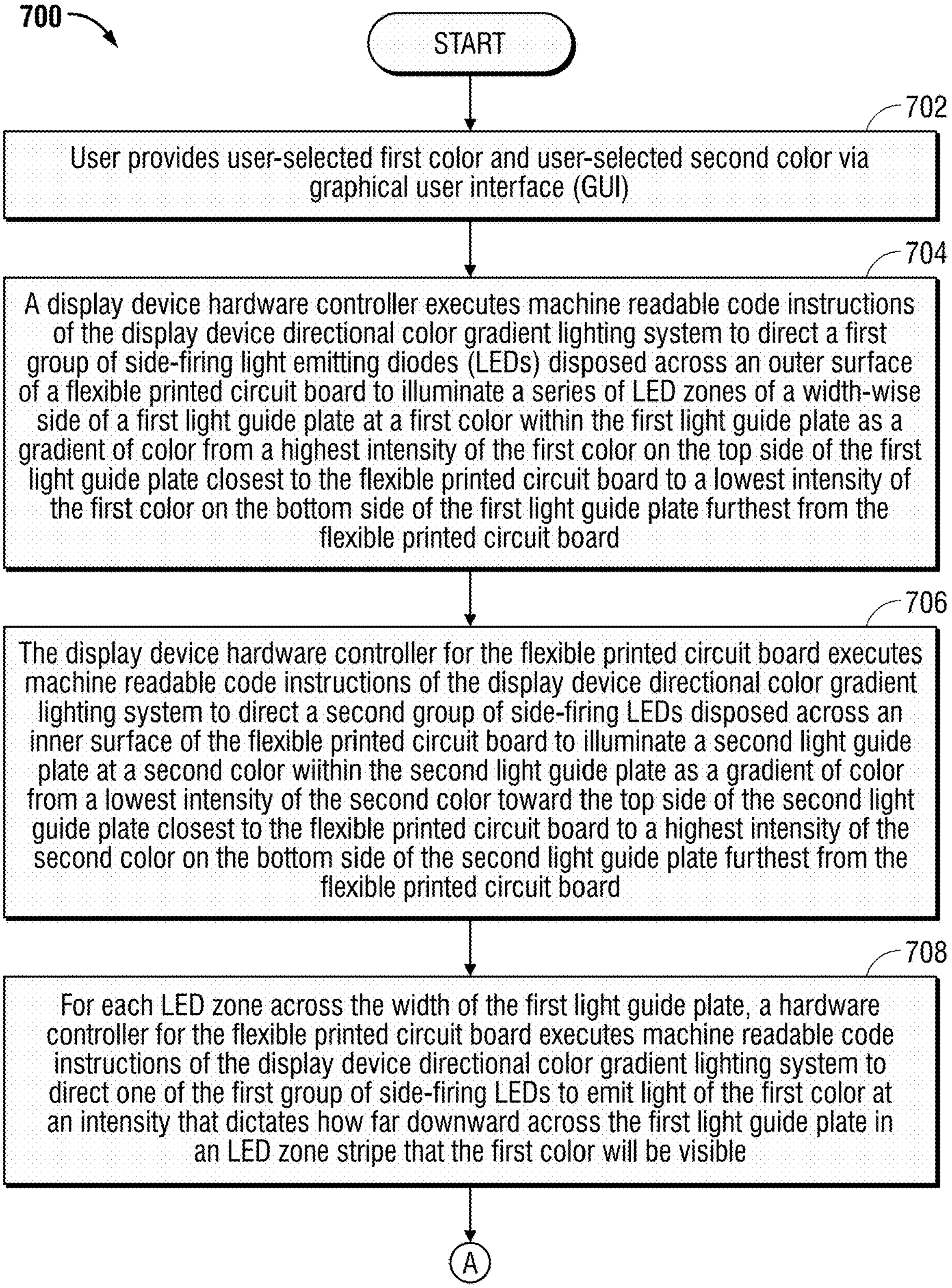
FIG. 7 is a flow diagram illustrating a method of a digital display device hardware controller executing machine readable code instructions of a display device directional color gradient lighting system to dynamically set light intensity values for LED pairs of a first and second color within each of a plurality of LED zones according to an embodiment of the present disclosure.
Figure 7:
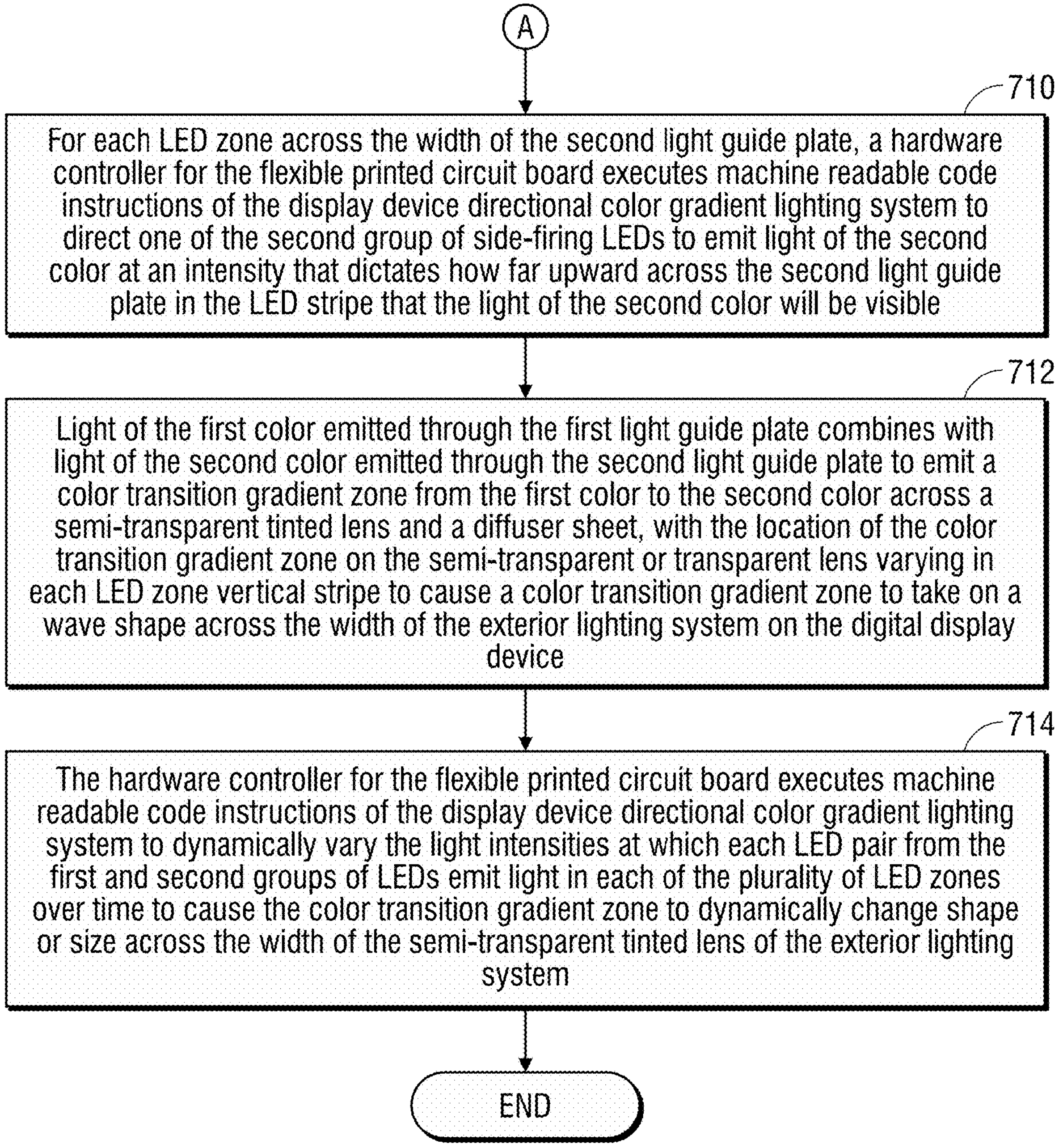

FIG. 7 is a flow diagram illustrating a method of a digital display device hardware controller executing machine readable code instructions of a display device directional color gradient lighting system to set light intensity values for pairs of a light emitting diode (LED) of a first color and an LED of a second color within each of a plurality of LED zones disposed across the width of an exterior lighting system for a digital display device according to an embodiment of the present disclosure. As described herein, light of the first color emitted through the first light guide plate in an embodiments may combine with light of the second color emitted through the second light guide plate to emit a color gradient via a semi-transparent or transparent lens layer of the exterior lighting system. In some embodiments, emitted light may have an adjustable color gradient transition zone from the first color to the second color across the semi-transparent or transparent lens disposed on an outer surface of a diffuser sheet lining the outer surface of the first light guide plate or other outer light guide plate in the stack up of the exterior lighting system. In an embodiment, the height or location of the semi-transparent or transparent lens at which the light emitted changes from one color to another and the size of the color gradient transition zone may vary in each LED zone vertical stripe across a width of the semi-transparent or transparent lens width to cause a changing color transition gradient zone to take on a perceived wave shape across the width of the semi-transparent or transparent lens. Further, the digital display hardware controller for the flexible printed circuit board executes machine readable code instructions of the display device directional color gradient lighting system to vary the intensities of emitted light over time at each LED pair of the first group of LEDs and the second group of LEDs in each of the plurality of LED zones to cause the color transition gradient zone to dynamically move and change size in transition from the first color to the second color across the width of the semi-transparent or transparent lens in another embodiment.

At block 702, a user in an embodiment may provide a user-selected first color and a user-selected second color for display of a bi-directional color gradient from the first color to the second color on an exterior lighting system at a digital display device housing, via graphical user interface (GUI). For example, in an embodiment described with respect to FIG. 1, a user may provide a user-selected first color, such as blue, for example, and user-selected second color, such as green, for example, via graphical user interface (GUI) 128. The digital display hardware controller 121 may then adjust colors of the first LED group 161 and the second LED group 162 accordingly if those LED groups have adjustable color LEDs in an embodiment.

A hardware controller for the flexible printed circuit board in an embodiment at block 704 may execute machine readable code instructions of the display device directional color gradient lighting system to direct a first group of side-firing LEDs disposed across an outer surface of the flexible printed circuit board to emit light of the first color. The first group of side-firing LEDs may be situated along a series of LED zones across a side or width of a first light guide plate to cause the first light guide plate to display light of the first color along its height. The first light guide plate may cause the first-colored light emitted by the first group of LEDs to be visible as a gradient of color from a highest intensity of the first color at the side of the first light guide plate closest to the flexible printed circuit board to a lowest intensity of the first color at the first light guide plate location away from the side with the flexible printed circuit board and the first LED of the LED pair from the first group of side-firing LEDs.

For example, in an embodiment described with reference to FIG. 4, the digital display hardware controller for the flexible printed circuit board 422 may execute machine readable code instructions of the display device directional color gradient lighting system to direct a first group of side-firing LEDs, such as first LED 461, disposed across an outer surface of the flexible printed circuit board 422 to emit light of the first color. The first light guide plate 463 may cause the first type of colored light emitted by the first group of LEDs 461 in such an example embodiment to be visible as a gradient of color from a highest intensity of blue light on the side of the first light guide plate 463 closest to the flexible printed circuit board 422 and LED 461 to a lowest intensity of the first colored light as light progresses through the first light guide plate to the side of the first light guide plate 463 furthest from the flexible printed circuit board 422. In other words, as the first-colored light moves in the negative Y direction through the first light guide plate 463.

In another example embodiment described with respect to FIG. 3, a hardware controller for the flexible printed circuit board 322 may execute machine readable code instructions of the display device directional color gradient lighting system to direct the first group of side-firing LEDs, such as first LED 361, disposed across the outer surface of the flexible printed circuit board 322 to emit light of the first color. The first light guide plate 363 may cause the first-colored light (e.g., blue light) emitted by the first group of LEDs 361 to be visible as a gradient of color from a highest intensity of the first color or blue light on the side of the first light guide plate 363 closest to the flexible printed circuit board 322 and LED 361 to a lowest intensity of first-colored light as light progresses through the first light guide plate 363 to the side of the first light guide plate 363 furthest from the flexible printed circuit board 322. In other words, intensity of first-colored light emitted through the light guide plate 363 in such an embodiment may decrease with distance in the negative Y direction away from the first LED group, such as 361. This is due to changes in index of refraction or levels of refractive material formed into the light guide plate structure of the first light guide plate in embodiments herein.

In yet another example embodiment described with respect to FIG. 5, a hardware controller for the flexible printed circuit board 522 may execute machine readable code instructions of the display device directional color gradient lighting system to direct a first group of side-firing LEDs 561*a*, 561*b*, 561*c*, and 561*d* disposed across an outer surface of the flexible printed circuit board 522 to emit light of the first color 583, such as blue. The first group of side-firing LEDs 561*a*, 561*b*, 561*c*, and 561*d* may be situated along a series of LED zones, such as 571, 572, 573, and 574 across a width in the X direction of a first light guide plate 563. These LED zones cause the first light guide plate to display light of the first color 583, such as blue, along the height or in the Y direction across the semi-transparent or transparent lens 560. The first light guide plate 563 may cause the first-colored light 583, such as blue light emitted by the first group of LEDs 561*a*, 561*b*, 561*c*, and 561*d* to be visible as a gradient of the first color, or blue, along the height, or in the negative Y direction of the semi-transparent or transparent lens 560 at a highest intensity from a side closest to the flexible printed circuit board 522 to a lowest intensity of the first color, such as blue, as light progresses through the first light guide plate to the lowest portion of the first light guide plate furthest from the flexible printed circuit board 522 and furthest in the negative Y direction.

At block 706 in an embodiment, the digital display hardware controller for the flexible printed circuit board may execute machine readable code instructions of the display device directional color gradient lighting system to direct a second group of side-firing LEDs disposed across an inner surface of the flexible printed circuit board to emit light of the second color. The second group of side-firing LEDs may be situated along a width-wise side of a second light guide plate in a series of LED zones of to cause the second light guide plate to display light of the second color along its height as the second color light passes through the second light guide plate. The second light guide plate may cause the second-colored light emitted by the second group of LEDs to be visible as a gradient of color from a lowest intensity of the second color on the side of the second light guide plate closest to the flexible printed circuit board and the second LED of an LED pair to a highest intensity of the second color as the second colored light progresses through the second light guide plate towards the side furthest from the flexible printed circuit board. In other words, the second light guide plate may increase intensity of the second-colored light passing through it from the edge of the second light guide plate closest to the LED and flexible PCB to the opposite side of the second light guide plate. This is due to changes in index of refraction or levels of refractive material formed into the light guide plate structure of the second light guide plate in embodiments herein. This progression of changes in index of refraction or levels of refractive material formed into the light guide plate structure of the second light guide plate may be an opposite progression to that of the first light guide plate in an example embodiment.

For example, in embodiments described with reference to FIG. 4, the digital display hardware controller for the flexible printed circuit board 422 may execute machine readable code instructions of the display device directional color gradient lighting system to direct a second group of side-firing LEDs 462 disposed across an inner surface of the flexible printed circuit board 422 to emit light of the second color 281, such as green, for example. The second light guide plate 464 may cause the green light emitted by the second group of LEDs 462 in such an example embodiment to be visible as a gradient of color from a lowest intensity of green light on the side of the second light guide plate 464 closest to the flexible printed circuit board 422 to a highest intensity of the green light on the side of the second light guide plate 464 furthest from the flexible printed circuit board 422, moving in the negative Y direction as described in embodiments herein. In an embodiment described in FIG. 2, the second light guide plate may increase intensity of green light 281 passing through it and the first light guide plate may decrease intensity of blue light 283 passing through it toward the bottom of the exterior lighting system on or in the digital display device 220, which may result in the display of greener light 281 toward the bottom of the exterior lighting system and bluer light 283 toward the top of the exterior lighting system on the digital display 220.

In another example embodiment described with respect to FIG. 3, the digital display hardware controller for the flexible printed circuit board 322 may execute machine readable code instructions of the display device directional color gradient lighting system to direct the second group of side-firing LEDs in each LED pair, such as LED 362, disposed across the inner surface of the flexible printed circuit board 322 to emit light of the second color, such as green, for example. The second light guide plate 364 may cause the second-colored light, such as green, emitted by the second group of LEDs 362 to be visible as a gradient of color from a lowest intensity of the second color, or green light, on the side of the second light guide plate 364 closest to the flexible printed circuit board 322 to a highest intensity of the green light on the side of the second light guide plate 364 furthest from the flexible printed circuit board 322. In other words, intensity of green light emitted through the light guide plate 364 in such an embodiment may increase with distance in the negative Y direction away from the second LED 362.

In yet another example embodiment described with respect to FIG. 5, the digital display hardware controller for the flexible printed circuit board 522 may execute machine readable code instructions of the display device directional color gradient lighting system to direct a second group of side-firing LEDs 562*a*, 562*b*, 562*c*, or 562*d* disposed across an inner surface of the flexible printed circuit board 522 to emit light of the second color 581. The second group of side-firing LEDs 562*a*, 562*b*, 562*c*, or 562*d* may be situated along a width side in the X direction of a second light guide plate to form a series of LED zones 571, 572, 573, and 574 to cause the second light guide plate to display light of the second color 581, such as green, along its height and across the exterior lighting system of the digital display device.

At block 708, the digital display hardware controller for the flexible printed circuit board may execute machine readable code instructions of the display device directional color gradient lighting system to direct one of the first group of LEDs to emit light of the first color at a first LED zone-specific intensity for each LED zone across the width of the first light guide plate in an embodiment. As described herein, this first LED zone-specific intensity may vary from LED zone to LED zone. The distance across the height of the first light guide plate in an LED zone stripe perceived from the exterior lighting system that the light of the first color will be visible is dictated by this first LED zone-specific intensity, which controls brightness of the first LED that belongs to the first LED group from the LED pair in each LED zone.

For example, in an embodiment described with reference to FIG. 2, for each LED zone across the width (X-direction) of the first light guide plate in an embodiment, the digital display hardware controller for the flexible printed circuit board may execute machine readable code instructions of the display device directional color gradient lighting system to direct one of the first group of LEDs to emit light of the first color 283 at a first LED zone-specific intensity. The distance across the height in the Y direction of the first light guide plate in a stripe that includes the LED zone that the light of the first color 283 will be visible, or the line at which the visible light moves from the first color 283 to a mixture 282 of the first and second color, is dictated by this first LED zone-specific intensity, which controls brightness of the LED in each LED zone that belongs to the first LED group.

In another example embodiment described with respect to FIG. 5, for each LED zone, such as 571, across the width of the first light guide plate 563, the digital display hardware controller for the flexible printed circuit board 522 may execute machine readable code instructions of the display device directional color gradient lighting system to direct one of the first group of LEDs, such as 561*a* to emit light of the first color 583, such as blue, at a first LED zone-specific intensity. More specifically, the digital display hardware controller for the flexible printed circuit board 522 may execute machine readable code instructions of the display device directional color gradient lighting system to direct LED 561*a* to emit light of the first color 583, such as blue, at a first LED zone-specific intensity value, such as 125. As another example, the digital display hardware controller for the flexible printed circuit board 522 may execute machine readable code instructions of the display device directional color gradient lighting system to direct LED 561*d* to emit light of the first color 583, such as blue, at another LED zone-specific intensity value, such as 100.

As described herein, this first LED zone-specific intensity may vary from LED zone to LED zone. The distance across the height in the negative Y direction of the first light guide plate 563 in a vertical stripe, such as shown in LED zone 571 that the light of the first color 583, such as blue, will be visible is dictated by this first LED zone-specific intensity, which controls brightness of the LED in each LED zone that belongs to the first LED group. For example, because the first LED zone-specific intensity for LED zone 571 in an example embodiment is 125, which may be greater than the first LED zone-specific intensity of 100 for LED zone 574, the distance 575 in the negative Y direction within LED zone 571 may be greater than the distance 574 in the negative Y direction within LED zone 574.

The digital display hardware controller for the flexible printed circuit board in an embodiment at block 710 may execute machine readable code instructions of the display device directional color gradient lighting system to direct one of the second group of LEDs to emit light of the second color at a second LED zone-specific intensity for each LED zone across the width of the second light guide plate. The second LED zone-specific intensity in an embodiment may dictate the distance across the height of the second light guide plate in a stripe that includes the LED zone that the light of the second color will be visible. This second LED zone-specific intensity may control brightness of the LED in each LED zone that belongs to the second LED group.

For example, in an embodiment described with respect to FIG. 2, the digital display hardware controller for the flexible printed circuit board in an embodiment may execute machine readable code instructions of the display device directional color gradient lighting system to direct one of the second group of LEDs to emit light of the second color 281 at a second LED zone-specific intensity for each LED zone across the width (X-direction) of the second light guide plate. The second LED zone-specific intensity in an embodiment may dictate the distance across the Y-direction height of the second light guide plate in a stripe that includes the LED zone that the light of the second color 281 will be visible, or the line at which the visible light moves from the mixture 282 of the first and second color to the second color 283. This second LED zone-specific intensity may control brightness of the LED in each LED zone that belongs to the second LED group.

In another example embodiment described with respect to FIG. 5, the digital display hardware controller for the flexible printed circuit board 522 may execute machine readable code instructions of the display device directional color gradient lighting system to direct one of the second group of LEDs 562*a* 562*b*, 562*c*, or 562*d* to emit light of the second color 581, such as green, at a second LED zone-specific intensity for each LED zone 571, 572, 573, or 574 across the width in the X direction of the second light guide plate (not shown, but disposed beneath the first light guide plate 563). The second LED zone-specific intensity in an embodiment may dictate the distance across the height in the positive Y direction of the second light guide plate in a stripe that includes the LED zone 571, 572, 573, or 574 that the light of the second color 581, such as green will be visible is dictated by this second LED zone-specific intensity, which controls brightness of the LED of the second LED group, such as 562*a*, 562*b*, 562*c*, or 562*d* in each LED zone 571, 572, 573, or 574 that belongs to the second LED group. More specifically, the digital display hardware controller for the flexible printed circuit board 522 may execute machine readable code instructions of the display device directional color gradient lighting system to direct LED 562*a* to emit light of the second color 581, such as green, at a second LED zone-specific intensity value, such as 160. As another example, the digital display hardware controller for the flexible printed circuit board 522 executes machine readable code instructions of the display device directional color gradient lighting system to direct LED 562*d* to emit light of the second color 581, such as green, at another LED zone-specific intensity value, such as 110.

As described herein, this second LED zone-specific intensity may vary from LED zone to LED zone. The distance across the height in the positive Y direction extended from the bottom edge of the second light guide plate (not shown, but disposed beneath the first light guide plate 563) in a vertical stripe, such as shown in LED zone 571 that the light of the second color 581, such as green, will be visible is dictated by this second LED zone-specific intensity, which controls brightness of the LED in each LED zone that belongs to the second LED group. For example, because the second LED zone-specific intensity for LED zone 571 in an example embodiment is 160, which may be greater than the second LED zone-specific intensity of 110 for LED zone 574, the distance 576 in the positive Y direction within LED zone 571 may be greater than the distance 577 in the positive Y direction within LED zone 574.

At block 712 in an embodiment, light of the first color emitted through the first light guide plate may combine with light of the second color emitted through the second light guide plate to emit a color gradient, from the first color to the second color, across the height of a semi-transparent or transparent lens disposed across an outer surface of the first light guide plate or outer light guide plate in the stack up of the exterior lighting system on the digital display device. The distance across the height of the semi-transparent or transparent lens at which the visible light changes from the first color to the second color may be varied in each separate LED zone stripe across the semi-transparent or transparent lens via execution of machine code instructions of the execute machine readable code instructions of the display device directional color gradient lighting system varying intensity of first and second colored light from between each LED pair for each separate LED zone. This variation may cause a color transition gradient zone across the plurality of LED zones in which the visible light moves from the first color to the second color to take on a wave shape across the width of the semi-transparent or transparent lens of the exterior lighting system.

For example, in an embodiment described with respect to FIG. 2, light of the first color 283 emitted through the first light guide plate in an embodiment may combine with light of the second color 281 emitted through the second light guide plate to emit a color gradient, from the first color 283 to a mixture at the color transition gradient zone 282 of the first color 283 and the second color 281, and finally to the second color 281, across the height in the Y-direction of a semi-transparent or transparent lens 260 of the exterior lighting system on the display housing 228 of the digital display device 220. The distance across the height in the Y direction of the semi-transparent or transparent lens 260 disposed across an outer surface of the first light guide plate or outer light guide plate forms the exterior lighting system on a portion of the rear housing 228 of the digital display device 220 at which the visible light changes from the first color 283 to the second color 281, or the mixture in the color transition gradient zone 282 between the first color 283 and the second color 281 may vary in each LED zone stripe across the semi-transparent or transparent lens 260 width in the X-direction. This variation may cause the color transition gradient zone 282 in which the visible light moves from the first color 283 to the second color 281 to take on a wave shape across the width in the X-direction of the semi-transparent or transparent lens 260.

As another example, in an embodiment described with respect to FIG. 5, light of the first color 583, such as blue, emitted through the first light guide plate and the semi-transparent or transparent external lens 560 may combine with light of the second color 581, such as green emitted through the second light guide plate to emit a color gradient, from the first color 583 to the second color 581, for example from blue to green, across the height in the negative Y direction of a semi-transparent or transparent external lens 560 formed over the parallel first and second light guide plates (not shown, but under the semi-transparent or transparent external lens 560 in the stack up of the exterior lighting system as in FIG. 3). This variation may cause the color transition gradient zone 582 in which the visible light moves from the first color 583 to the second color 581, or from blue to green, to take on a wave shape across the width in the X direction of the semi-transparent or transparent lens.

In an embodiment at block 714, the digital display hardware controller for the flexible printed circuit board may execute machine readable code instructions of the display device directional color gradient lighting system to dynamically vary the intensities at which each pair of LEDs, one from the first group of LEDs and one from the second group of LEDs, in each of the plurality of LED zones emits light over time to cause the color transition gradient zone in which the visible light transitions or blends from the first color to the second color to dynamically change shape and size across the width of the semi-transparent or transparent lens over time. For example, in an embodiment described with reference to FIG. 2, the digital display hardware controller for the flexible printed circuit board in an embodiment may execute machine readable code instructions of the display device directional color gradient lighting system to dynamically vary the intensities at pairs of LEDs, one from the first group of LEDs and one from the second group of LEDs, in each of the plurality of LED zones emits light over time to cause the color transition gradient zone 282 between the first color 283 to the second color 281 to dynamically change shape or size over time across the width in the X-direction of the semi-transparent or transparent lens 260 of the exterior lighting system on the display housing 228. In another example embodiment described with respect to FIG. 5, the digital display hardware controller for the flexible printed circuit board 522 may execute machine readable code instructions of the display device directional color gradient lighting system to dynamically vary the intensities at which each pair of LEDs 561*a*, 562*a* for LED zone 571, LEDs 561*b*, 562*b* for LED zone 572, LEDs 561*c*, 562*c* for LED zone 573, LEDs 561*d*, 562*d* for LED zone 574, and so forth emit light over time to cause the color transition gradient zone 582 in which the visible light moves from the first color 583 to the second color 581 to dynamically change shape or size differently over time among the LED zones 571, 572, 573, 574 across the width in the X direction of the semi-transparent or transparent lens 560 of the exterior lighting system for a digital display device. Reduction of LED intensity shortens the length of either the first or second colored light and reduces overall brightness along an LED zone stripe as perceived through the semi-transparent or transparent lens 560. Increasing LED intensity lengthens either the first or second colored light and increases overall brightness along an LED zone stripe as perceived through the semi-transparent or transparent lens 560. The LED zone stripes may not be clearly perceived as delineated as perceived through the semi-transparent or transparent lens 560. This blending and softening of the LED zones and softening of the color transition gradient zone 582 may be enhanced with the user of a diffuser sheet under the semi-transparent or transparent lens 560 and over the first and second light guide plates in some embodiments. Further, overall brightness of first and second colored light of the LED zone stripes as perceived through the semi-transparent or transparent lens 560 may be enhanced with use of a reflector sheet or layer under the first and second light guide plates in some embodiments.

In such a way, the digital display hardware controller for the flexible printed circuit board executes machine readable code instructions of the display device directional color gradient lighting system to dynamically vary the intensities at which each of the first group of LEDs and the second group of LEDs in each of the plurality of LED zones emits light over time to cause the color transition gradient zone in which the emitted light moves from the first color to the second color to change shape or size across the width of the semi-transparent or transparent lens over time. The method for a digital display device hardware controller executing machine readable code instructions of a display device directional color gradient lighting system to dynamically set light intensity values for LEDs of a first and second color within each of a plurality of LED zones may then end.

The blocks of the flow diagram of FIGS. 6 and 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those capable in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A digital display device executing machine readable code instructions of a display device directional color gradient lighting system for an exterior lighting system comprising:

the exterior lighting system formed of a stack of layers including a first light guide plate, a second light guide plate, and a semi-transparent or transparent lens layer, where the exterior lighting system is installed at a display device housing of the digital display device;

an outer surface of a flexible printed circuit board (FPCB) coupled to a first group of side-firing light emitting diodes (LEDs) situated along a side of the first light guide plate for emitting light of a first color through the first light guide plate with the first light guide plate causing intensity of visible light of the first color displayed from the exterior lighting system to decrease across a first light guide structure of the first light guide plate as perceived through the semi-transparent or transparent lens layer;

an inner surface of the FPCB operatively coupled to a second group of side-firing LEDs situated along a side of the second light guide plate for emitting light of a second color through the second light guide plate height with the second light guide plate causing intensity of visible light of the second color to increase across a second light guide structure of the second light guide plate as perceived through the semi-transparent or transparent lens layer;

a plurality of LED zones formed across the exterior lighting system to each include LED pairs including one LED of the first group of side-firing LEDs and one LED of the second group of side-firing LEDs; and the digital display hardware controller of the FPCB for executing machine readable code instructions of the display device directional color gradient light system to direct one of the first group of side-firing LEDs and one of the second group of side-firing LEDs in each of the plurality of LED zones to emit light at an LED zone-specific intensity to cause a shape of color transition gradient zones transitioning viewable visible color from the first color to the second color of the LED zones to vary across a width of the semi-transparent or transparent lens of the exterior lighting system.

2. The digital display device of claim 1, wherein the first color and the second color are selected by a user via a graphical user interface (GUI).

3. The digital display device of claim 1, wherein the first group of side-firing LEDs and the second group of side-firing LEDs are multi-color red-green-blue (RGB) LEDs controllable for color selection of light of the first color and light of the second color respectively.

4. The digital display device of claim 1 further comprising:

the semi-transparent or transparent lens of the exterior lighting system is fixed to one or more portions of the display housing for the digital display device such that at least a portion of the exterior lighting system is covered by an external portion of the display housing.

5. The digital display device of claim 1 further comprising:

the first group of side-firing LEDs disposed on a side of the first light guide panel and the second group of side-firing LEDs disposed on a side the second light guide panel with the first group of side-firing LEDs are spaced across an outer surface of the FPCB and second group of side-firing LEDs are spaced across an inner surface of the FPCB for form the pairs of LEDs assigned to the LED zones and to decrease thickness of the exterior lighting system on the display housing for the digital display device.

6. The digital display device of claim 1 further comprising:

the exterior lighting system formed of the stack of layers including a diffuser sheet disposed over the first light guide plate and the second light guide plate and under the semi-transparent or transparent lens layer to soften the distinction of the LED zones and the color transition gradient zone.

7. The digital display device of claim 1 further comprising:

the exterior lighting system formed of the stack of layers including a reflector layer under the second light guide plate and the first light guide plate to improve brightness of the light of the first color, light of the second color, and the color transition gradient zone as perceived from the semi-transparent or transparent lens layer.

8. The digital display device of claim 1 further comprising:

the digital display hardware controller of the FPCB for executing machine readable code instructions of the display device directional color gradient light system to dynamically adjust over time the LED zone-specific intensity for each LED in the LED pairs assigned to each of the plurality of LED zones to cause the shape of the color transition gradient zone for each LED zone to dynamically change distinctly from other LED zone across a width of the semi-transparent or transparent lens.

9. A method of executing machine readable code instructions of a display device directional color gradient lighting system to control bi-directional color gradient lighting for an exterior lighting system on display housing of a digital display device comprising:

directing, via a digital display hardware controller executing machine readable code instructions of the display device directional color gradient lighting system, a first group of side-firing light emitting diodes (LEDs) on a first side of a flexible printed circuit board (FPCB) to emit light of a first color through a side of a first light guide plate in a plurality of LED zones each having a first LED from the first group of side-firing LEDs;

directing, via the digital display hardware controller executing machine readable code instructions of the display device directional color gradient lighting system, a second group of side-firing LEDs on a second side of the FPCP to emit light of a second color through a side of a second light guide plate in the plurality of LED zones each having a second LED from the second group of side-firing LEDs to cause a color transition gradient zone across each LED zone that transitions from the first color to the second color as perceived from a semi-transparent or transparent lens layer disposed over the first light guide plate and the second light guide plate of the exterior lighting system, where the exterior lighting system is formed of a stack of layers including the first light guide plate, the second light guide plate, and the semi-transparent or transparent lens layer;

controlling, via the digital display hardware controller executing machine readable code instructions of the display device directional color gradient lighting system, each of the plurality of LED zones to emit light at a first LED zone-specific intensity such that a lower first LED zone-specific intensity of the first LED decreases extension of light of the first color into the color transition gradient zone and a higher LED zone-specific intensity increases extension of light of the first color into the color transition gradient zone of each LED zone; and controlling, via the digital display hardware controller executing machine readable code instructions of the display device directional color gradient lighting system, each of the plurality of LED zones to emit light at a second LED zone-specific intensity such that a lower second LED zone-specific intensity of the second LED decreases extension of light of the second color into the color transition gradient zone and a higher second LED zone-specific intensity increases extension of light of the second color into the color transition gradient zone of each LED zone to cause a shape of the color transition gradient zones to vary across a width of the semi-transparent or transparent lens of the exterior lighting system.

10. The method of claim 9 further comprising:

receiving a user selection of the first color and the second color via a graphical user interface and the first group of side-firing LEDs and the second group of side-firing LEDs are variable intensity multi-color red-green-blue (RGB) LEDs controllable for color selection.

11. The method of claim 9 further comprising:

dynamically adjusting, via the digital display hardware controller executing machine readable code instructions of the display device directional color gradient lighting system, the first LED zone-specific intensities of the first group of side-firing LEDs or the second LED zone-specific intensities of the second group of side-firing LEDs in each of the plurality of LED zones over time to cause the shape of the color transition gradient zone to dynamically change as perceived across a width of the semi-transparent or transparent lens layer over time.

12. The method of claim 9, wherein the first light guide plate has a first light guide structure with varied index of refraction or decreasing deposition of diffusion material causing intensity of visible light of the first color to decrease across the first light guide plate as perceived through the semi-transparent or transparent lens layer, and the second light guide plate has a second light guide structure with varied index of refraction or progressive deposition of diffusion material causing intensity of visible light of the second color to increase across the second light guide plate as perceived through the semi-transparent or transparent lens layer.

13. A digital display device executing machine readable code instructions of a display device directional color gradient lighting system for an exterior lighting system comprising:

the exterior lighting system formed of a stack of layers including a first light guide plate, a second light guide plate, and a semi-transparent or transparent lens layer, where the exterior lighting system is installed at a display device housing of the digital display device;

an outer surface of a flexible printed circuit board (FPCB) coupled to a first group of side-firing light emitting diodes (LEDs) situated along a side of the first light guide plate for emitting light of a first color through the first light guide plate with the first light guide plate causing intensity of visible light of the first color displayed from the exterior lighting system to decrease across a first light guide structure of the first light guide plate as perceived through the semi-transparent or transparent lens layer;

an inner surface of the FPCB operatively coupled to a second group of side-firing LEDs situated along a side of the second light guide plate for emitting light of a second color through the second light guide plate height with the second light guide plate causing intensity of visible light of the second color to increase across a second light guide structure of the second light guide plate as perceived through the semi-transparent or transparent lens layer;

a plurality of LED zones formed across the exterior lighting system to each include LED pairs including one LED of the first group of side-firing LEDs and one LED of the second group of side-firing LEDs; and the digital display hardware controller of the FPCB for executing machine readable code instructions of the display device directional color gradient light system to control pairs of LEDs, including a first LED of the first group of side-firing LEDs and a second LED of the second group of side-firing LEDs, in each of the plurality of LED zones to emit light at a first LED zone-specific intensity such that a lower first LED zone-specific intensity of the first LED decreases extension of light of the first color into the color transition gradient zone and a higher LED zone-specific intensity increases extension of light of the first color into the color transition gradient zone of each LED zone to cause a shape of the color transition gradient zones to vary across a width of the semi-transparent or transparent lens of the exterior lighting system.

14. The digital display device of claim 13 further comprising:

the digital display hardware controller of the FPCB for executing machine readable code instructions of the display device directional color gradient light system to control the pairs of LEDs in each of the plurality of LED zones to emit light at a second LED zone-specific intensity such that a lower second LED zone-specific intensity of the second LED decreases extension of light of the second color into the color transition gradient zone and a higher second LED zone-specific intensity increases extension of light of the second color into the color transition gradient zone of each LED zone to cause a shape of the color transition gradient zones to vary across a width of the semi-transparent or transparent lens of the exterior lighting system.

15. The digital display device of claim 13, wherein the first group of side-firing LEDs and the second group of side-firing LEDs are multi-color red-green-blue (RGB) LEDs controllable for color selection of light of the first color and light of the second color respectively via a graphical user interface (GUI).

16. The digital display device of claim 13 further comprising:

the semi-transparent or transparent lens of the exterior lighting system is fixed to one or more portions of the display housing for the digital display device such that at least a portion of the exterior lighting system is covered by an external portion of the display housing.

17. The digital display device of claim 13 further comprising:

the first group of side-firing LEDs disposed on a side of the first light guide panel and the second group of side-firing LEDs disposed on a side the second light guide panel with the first group of side-firing LEDs are spaced across an outer surface of the FPCB and second group of side-firing LEDs are spaced across an inner surface of the FPCB for form the pairs of LEDs assigned to the LED zones and to decrease thickness of the exterior lighting system on the display housing for the digital display device.

18. The digital display device of claim 13 further comprising:

the exterior lighting system formed of the stack of layers including a diffuser sheet disposed over the first light guide plate and the second light guide plate and under the semi-transparent or transparent lens layer to soften the distinction of the LED zones and the color transition gradient zone.

19. The digital display device of claim 13 further comprising:

the exterior lighting system formed of the stack of layers including a reflector layer under the second light guide plate and the first light guide plate to improve brightness of the light of the first color, light of the second color, and the color transition gradient zone as perceived from the semi-transparent or transparent lens layer.

20. The digital display device of claim 13 further comprising:

the digital display hardware controller of the FPCB for executing machine readable code instructions of the display device directional color gradient light system to dynamically adjust over time the LED zone-specific intensity for each LED in the LED pairs assigned to each of the plurality of LED zones to cause the shape of the color transition gradient zone for each LED zone to dynamically change distinctly from other LED zone across a width of the semi-transparent or transparent lens.

* * * * *